Dec. 27, 1966  R. TOWNSEND  3,294,960
ELECTRONIC TAX CALCULATION CIRCUIT FOR USE IN
BUSINESS ACCOUNTING SYSTEM
Filed Sept. 29, 1964  12 Sheets-Sheet 1
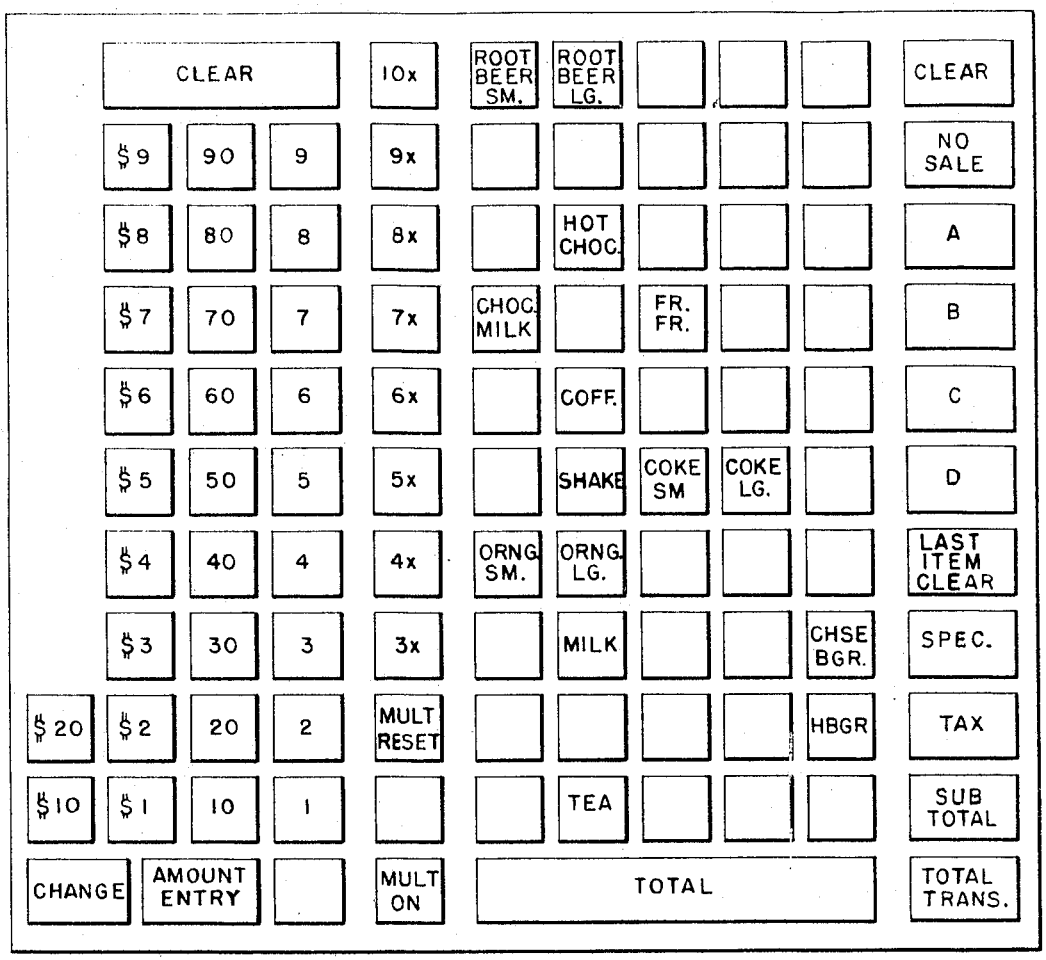
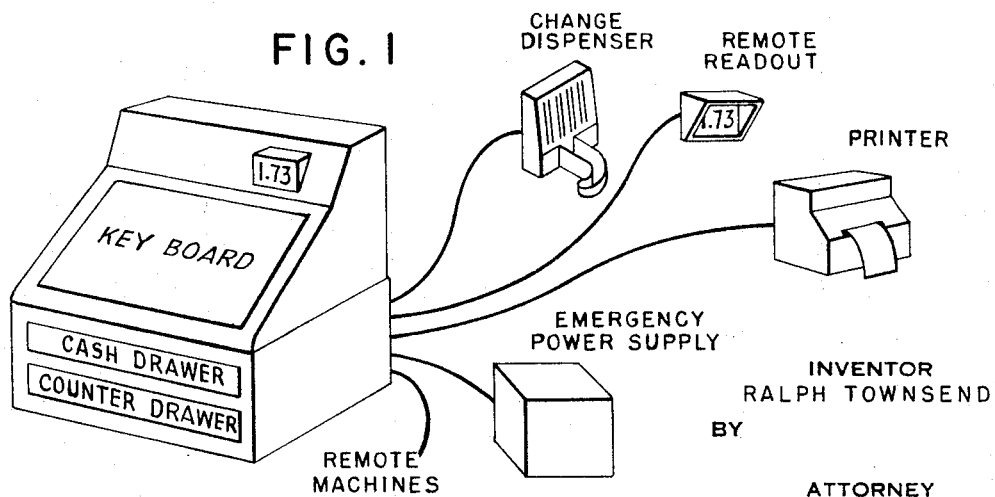
INVENTOR
RALPH TOWNSEND
BY
ATTORNEY Dec. 27, 1966  R. TOWNSEND  3,294,960
ELECTRONIC TAX CALCULATION CIRCUIT FOR USE IN
BUSINESS ACCOUNTING SYSTEM
Filed Sept. 29, 1964  12 Sheets-Sheet 2

INVENTOR
RALPH TOWNSEND
BY

ATTORNEY

Dec. 27, 1966    R. TOWNSEND    3,294,960
ELECTRONIC TAX CALCULATION CIRCUIT FOR USE IN
BUSINESS ACCOUNTING SYSTEM
Filed Sept. 29, 1964    12 Sheets-Sheet 4

INVENTOR
RALPH TOWNSEND
BY

ATTORNEY

MAIN IN-PHASE OSCILLATOR

180° PHASE ENABLE TRIGGER

INVENTOR
RALPH TOWNSEND

BY

ATTORNEY

INVENTOR
RALPH TOWNSEND
BY
ATTORNEY

INVENTOR
RALPH TOWNSEND
BY
ATTORNEY

Dec. 27, 1966 R. TOWNSEND 3,294,960
ELECTRONIC TAX CALCULATION CIRCUIT FOR USE IN
BUSINESS ACCOUNTING SYSTEM
Filed Sept. 29, 1964 12 Sheets-Sheet 12
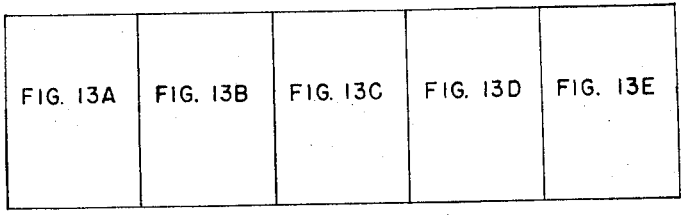
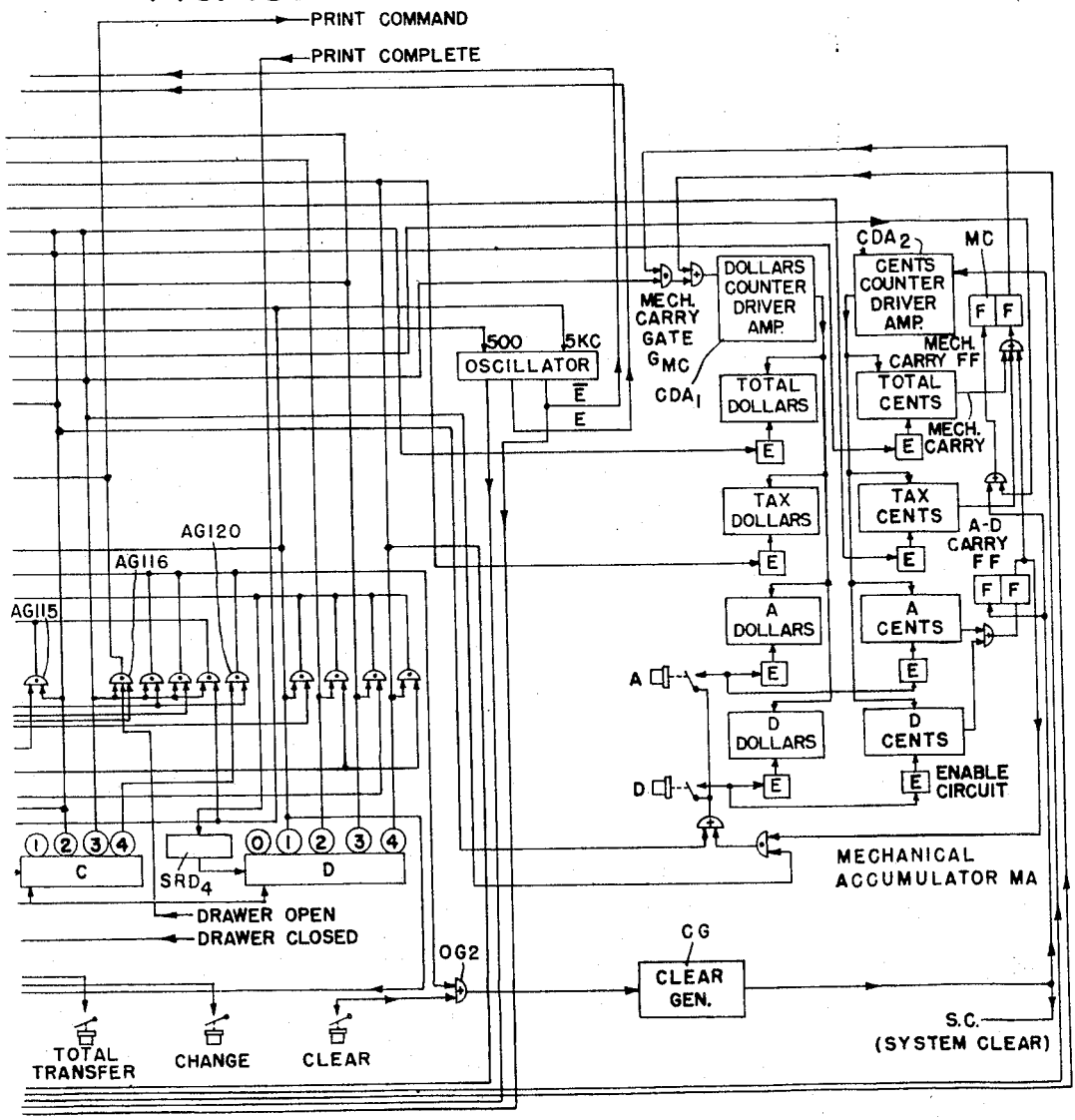
INVENTOR
RALPH TOWNSEND
BY
ATTORNEY

United States Patent Office 3,294,960
Patented Dec. 27, 1966

3,294,960
ELECTRONIC TAX CALCULATION CIRCUIT FOR USE IN BUSINESS ACCOUNTING SYSTEM
Ralph Townsend, Darien, Conn., assignor to American Machine & Foundry Company, a corporation of New Jersey
Filed Sept. 29, 1964, Ser. No. 400,067
12 Claims. (Cl. 235—160)

This invention relates to business accounting systems and machines, and particularly to such systems and machines for providing automatic price and tax computation, indication and storage, and other related accounting operations on, or records of, numerical data occurring in connection with the sale of items or services in limited item business establishments.

An object of the invention is to provide such automatic accounting operations quickly, accurately and economically with the use of a comparatively small amount of apparatus with simple solid state circuitry.

Another object is to provide in one machine certain basic accounting operations on numerical data in connection with the sale of different items or services on separate orders, and to enable the machine to be adapted readily to provide one or more other related accounting operations depending on special requirements encountered.

Other objects are to electronically compute the item and total prices and the tax thereon in connection with a sale of a number of items or services; to provide automatic visual indication of the computed prices to the operator and customer; to control the preparation of a bill with item and order prices; to electronically calculate the change from the amount tendered in payment of a bill; to produce accumulative records of the amount of sales, taxes and the number of items sold or dispensed over a given time period; and to provide automatically inventory and other business controls, including the control of the operation of a cash drawer in an accounting machine, the control of auxiliary machines or indicators and the resetting of the electronic control circuits for the machine to their initial operating condition after their operation.

These objects are attained in accordance with the invention by a system or machine for limited item use, in place of the usual cash register, which includes in a suitable console or container a basic unit for providing selected control operations, including computation of item and order prices, in connection with the sale of items or services; and provisions for readily changing this basic unit to include one or more different optional control features to meet the environmental needs of the machine. All of the control operations utilize solid state electronic circuitry throughout with their inherent advantage of known reliability which is mandatory in on-line operations of this type.

In accordance with the invention, some major considerations are minimal storage capacity requirements of the electronic control circuits and elimination of complexity by utilizing the inherent speed of the electronic circuitry, both of which contribute to cost reduction. Probably, an important advantage of the novel machine is its design flexibility. Printed circuit cards can be changed or the wiring modified with relative ease to facilitate adding optional features and connecting additional units thereto, such as a keyboard with preselected items, or an associated printer for automatic rapid billing.

A distinguishing feature of this machine is the provision of an item keyboard comprising a number of suitably-labeled service or item keying means or push buttons for controlling the electronic apparatus to enter the price of such a service or item, previously set up on an associated adjustable price board, into a total price by operation of the relevant key. Because all services or items do not have a fixed price, the item keyboard in the machine is supplemented by a manual amount keyboard of the standard adding machine type which can be used for direct parallel entry into the machine for special items.

In actual use of the machine, for example, several price lists may be set up each on an associated adjustable price board, of the printed circuit type with pre-set sliders or pins, which can be plugged into the machine or inserted into holders on the machine quickly and with ease. At the time of change, the individual descriptive labels on cards associated with the item or service keys on the keyboard may be changed accordingly, so that the operator need not consult a separate price list or remember any price except that of the special items entered through the amount keyboard.

As only a single bill is to be printed by an associated printer under control of the novel machine which is to be presented for payment, it is desirable to provide a record of the total cash received and the tax, if any, thereon. This is accomplished by the provision of two running total counters in the electronic equipment, which can be read at intervals and checked against the cash in the till.

In addition to the service or item and amount keys, the keyboard of the machine contains a number of other functional keys, push buttons or control bars for controlling the electronic control units to provide the computing, calculation or storage functions. The basic machine also contains lighted display means for visually indicating computed prices, a cash drawer and a counter drawer containing the electronic control units.

The electronic controls include two bidirectional registers, which may be referred to as the Input Register and the Total Register, constituting a memory for the machine. Each register is composed of four bidirectional ring counters having a maximum capacity of $99.99 and operating under control of keys on the keyboard in the manner which may be briefly described as follows: Amounts may be entered into the Input Register by operating an item or service key which energizes a price matrix in the associated adjustable price board having a maximum capacity of $9.99, entering a pre-set amount, or directly by operation of an amount key and an "amount entry" key to selectively enter a price. Operation of either the item key or amount entry key causes the Input Register price information to be added to the Total Register, and at some later time the new information is entered into the Input Register. This sequence of events is controlled by shift register means which, in effect, is pre-programmed for the item entry operating cycle of the machine to be referred to later.

The machine also includes a number of unidirectional ring counters controlled by different functional keys to control item entry into the Input Register, computing a sub-total or sub-total plus tax and to calculate change.

A feaure of the electronic control means is that, in order to speed information transfer, the dollars and cents are operated upon by the ring counters separately and simultaneously. The maximum number of pulses to be transferred is 99, which takes approximately 20 milliseconds. In transferring information between the Input Register and Total Register, the bidirectional counters in the Input Regiser are counted down, and those in the Total Register are counted up by the amount that was in the Input Register. The carry pulses, which can occur when the Total Register cents counter passes 99 pulses, are stored in an electronic flip-flop and entered in the Total Register dollars counter after both the dollars and cents Input Registers are at zero.

The optional features in the machine include additional item keys in modules of ten; a multiplier arrangement; an automatic tax computation circuit with an associated tax total counter; an automatic change calculating circuit; an emergency power supply; a transaction counter; separate mechanical data counters and an associated flip-flop control; and circuits for generating signals for controlling an external change dispenser, a printer, remote readout and other apparatus, such as inventory counters and remote machines for other purposes.

The optional multiplier arrangement is provided by a ring counter into which the number of each item purchased on each order and the total price thereof is set through a number of multiplier keys 3 to 10, in conjunction with operation of an item key. The optional inventory counters work in conjunction with the item keys and the multiplier keys, if used, to record the number of items ordered.

In the optional change calculation, the tendered amount is placed on the keyboard and the change calculated under control of a change key operating the ring counters so the amount of change is stored in the Input Register and is indicated on the price indicator.

The optional mechanical counters are used to accumulate such information as Total Sales, Individual Waiter Totals or Tax Totals. Because of the relatively slow speed of the mechanical counters (40 steps per second), the dollars and cents mechanical counters are operated simultaneously wherever possible, and any carries from the cents to the dollars counters are stored in an electronic flip-flop and passed into the dollar accumulator at some time other than when the dollar counter is being stepped.

The above and other objects and features of the invention will be better understood from the following detailed description thereof when read in conjunction with the various figures of the accompanying drawings in which:

FIG. 1 is a pictorial view of the system of the invention including perspective outline views of the machine, and associated apparatus which are controlled by signals therefrom;

FIG. 2 is a top view of the keyboard in the machine of FIG. 1;

FIGS. 13A to 13E are in combination, an overall schematic or logical diagram of the electronic circuits of a machine in accordance with the invention, including the optional features; and FIG. 14 is a block diagram of the relative arrangement of FIGS. 13A to 13E.

FIG. 1 pictorially illustrates a system in accordance with the invention and includes an outline perspective view of the computing and calculating machine showing its external appearance. The machine, as shown, includes as components: a sloping keyboard; a cash drawer; a counter drawer which houses the electronic control equipment, and a visual price indicator which may be of the known NIXIE neon lighted display type, or other suitable visual display devices.

Also, attached to the back of the machine are conductors for transmitting the control signals stored in the eleconic circuits in the counter drawer for controlling the operation of an external automatic change dispenser; a remote price readout, which also may be of the lighted display type; a printer for providing bills; and remote apparatus for inventory control and other purposes. For example, the controlled apparatus may include a menu item memory (MIM) device for controlling the operation of a food idspensing machine or automatic cooking apparatus and an associated inventory counter, such as disclosed in the co-pending patent application of William A. Hadley et al., Ser. No. 267,530, filed Mar. 25, 1962 (now abandoned). Also shown, are leads for connecting an emergency power supply, such as a battery through a plug-in socket (not shown) for use when the regular power source fails. The machine may include other plug-in sockets (not shown) for connecting the other control apparatus to the machine.

As shown in FIG. 2, the keyboard of the machine includes up to 50 suitably-labeled item keys or push buttons; a plurality of amount keys or push buttons; and a plurality of multiplier keys labeled 3 to 10. Also, the keyboard includes a number of functional keys including Amount Entry, Multiplier-Reset, Total Transfer, Sub-Total, Manual Tax, Special, No Sale, Clear and Change keys, Last Item Clear and Total bar, as shown. The keyboard may have provision, such as card holding clips (not shown), for facilitating changing the descriptive legends associated with the keys, and an adjustable price board or matrix which is attached to the keyboard in any suitable manner.

Register components

Figure 3:
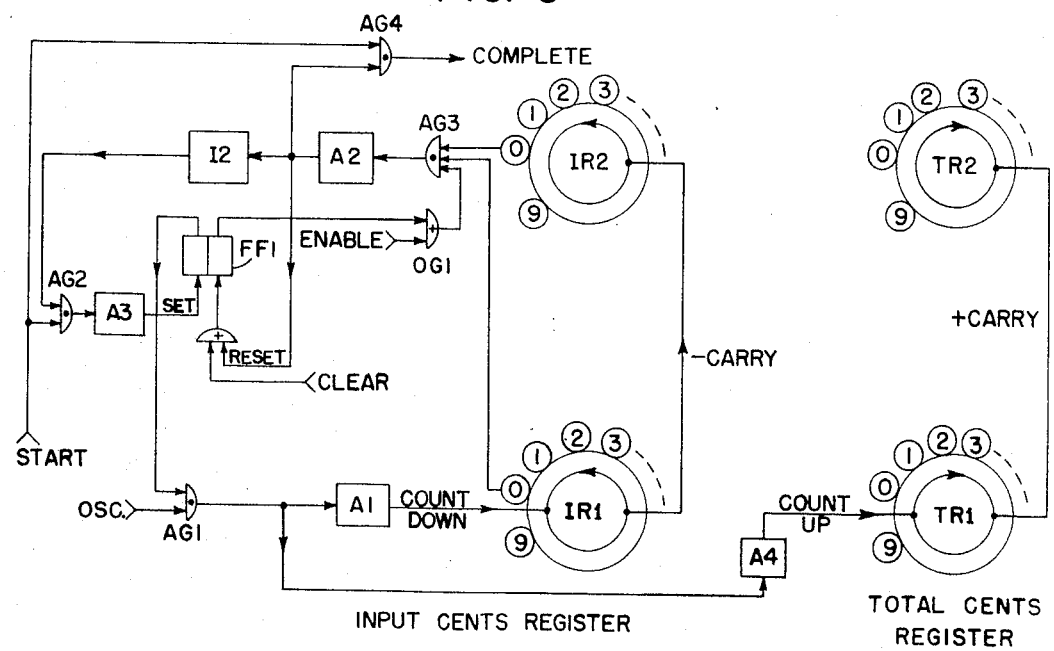
FIG. 3 is a block schematic of part of the register transfer block which is used for transferring price information from the Input to the Total Register.
Figure 13A:
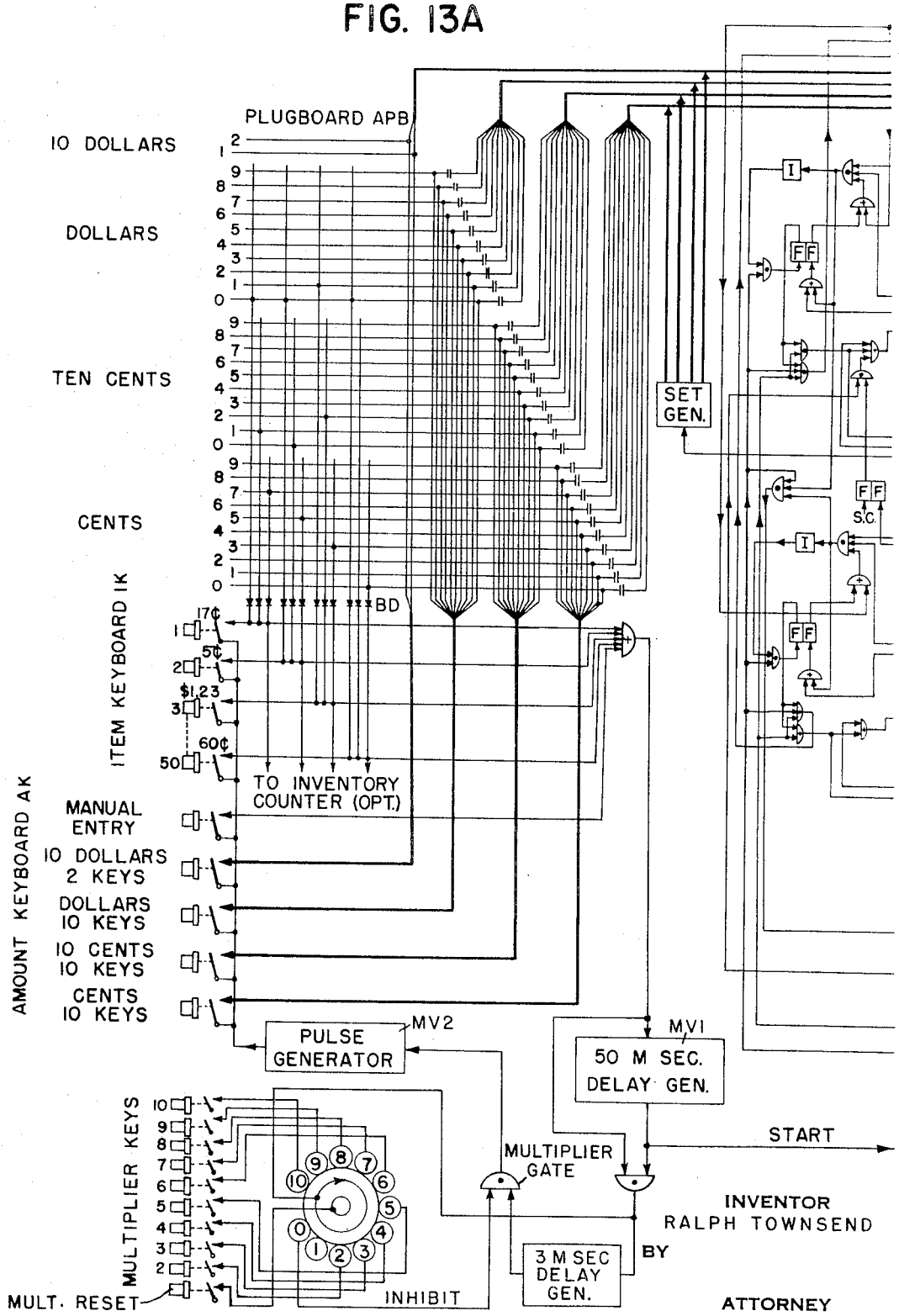
Figure 13B:
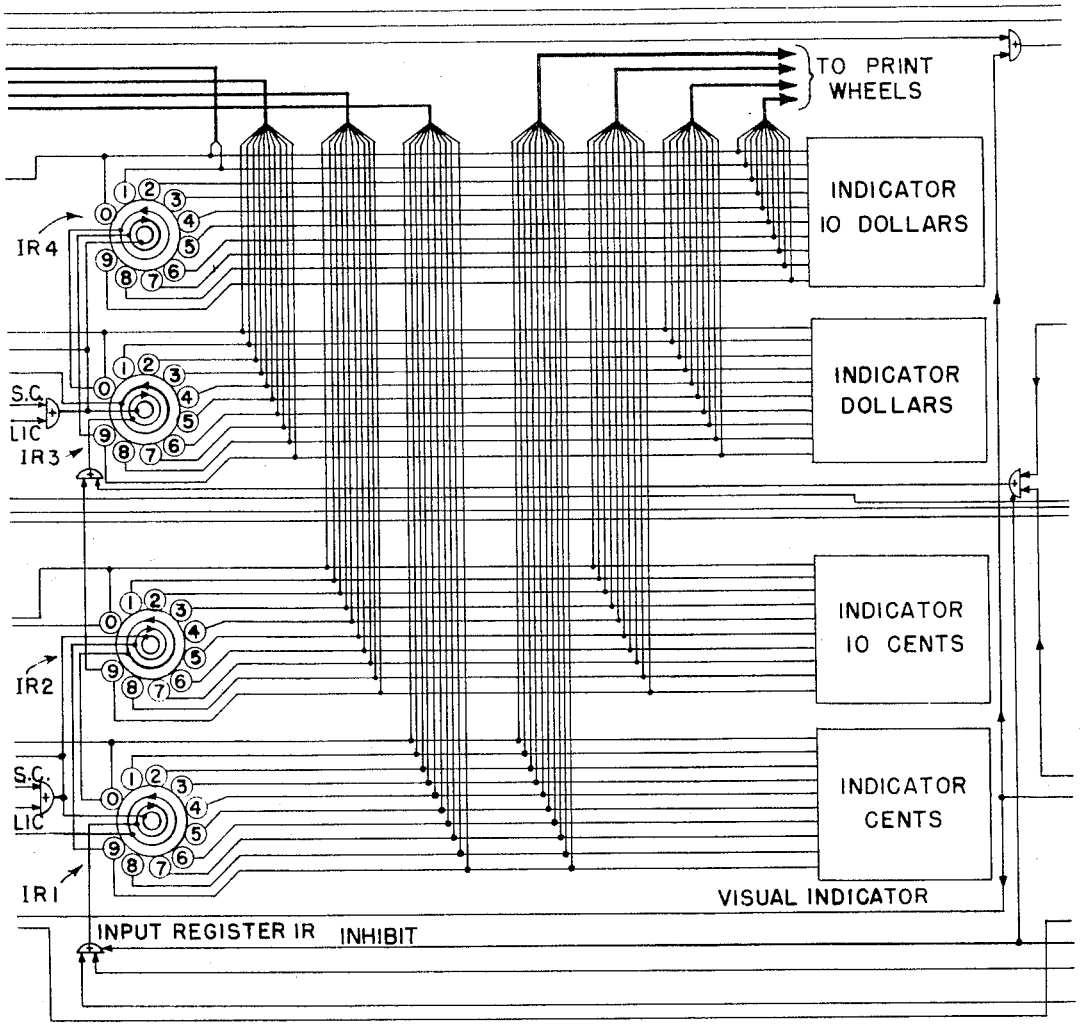
Figure 13C:
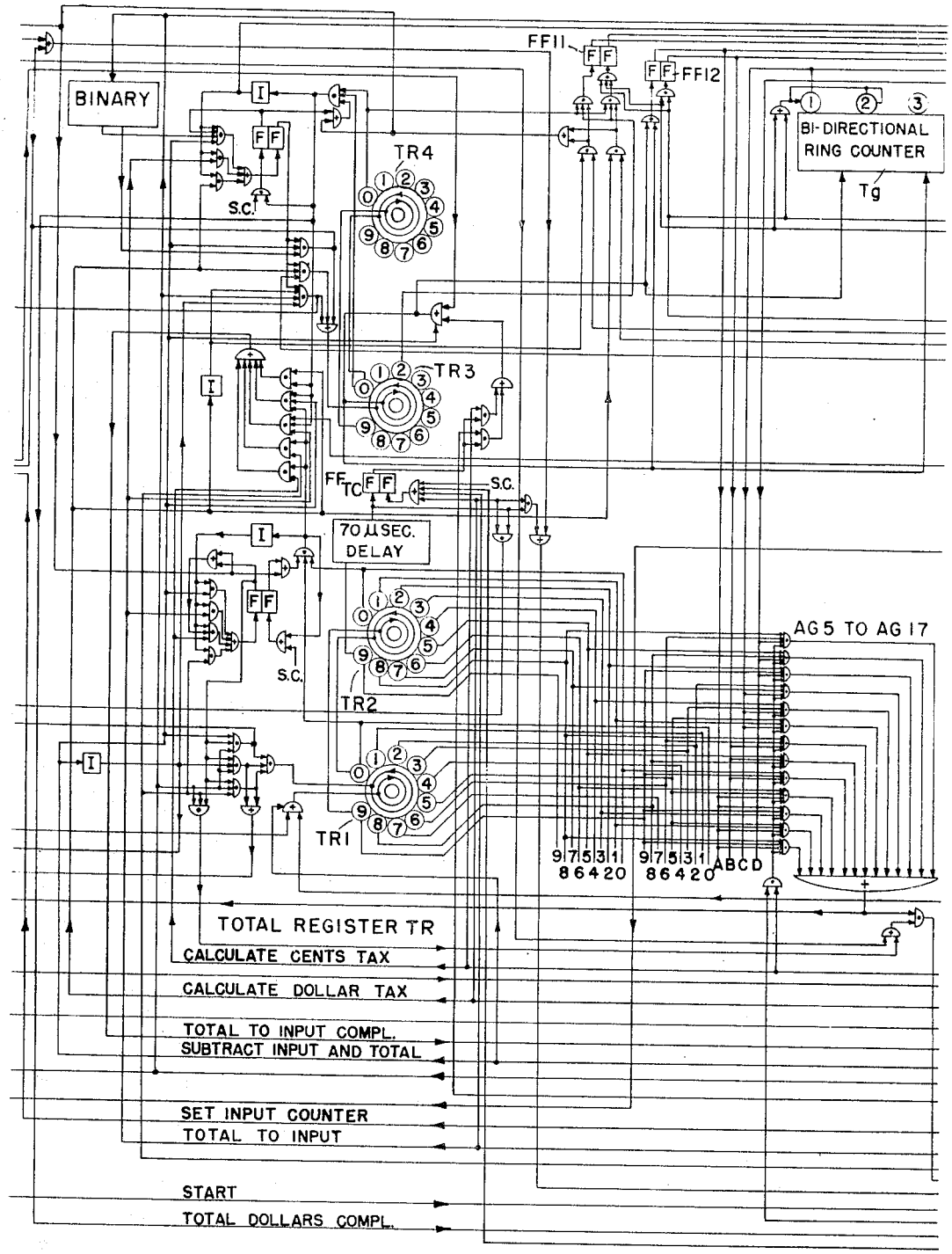
Figure 13D:
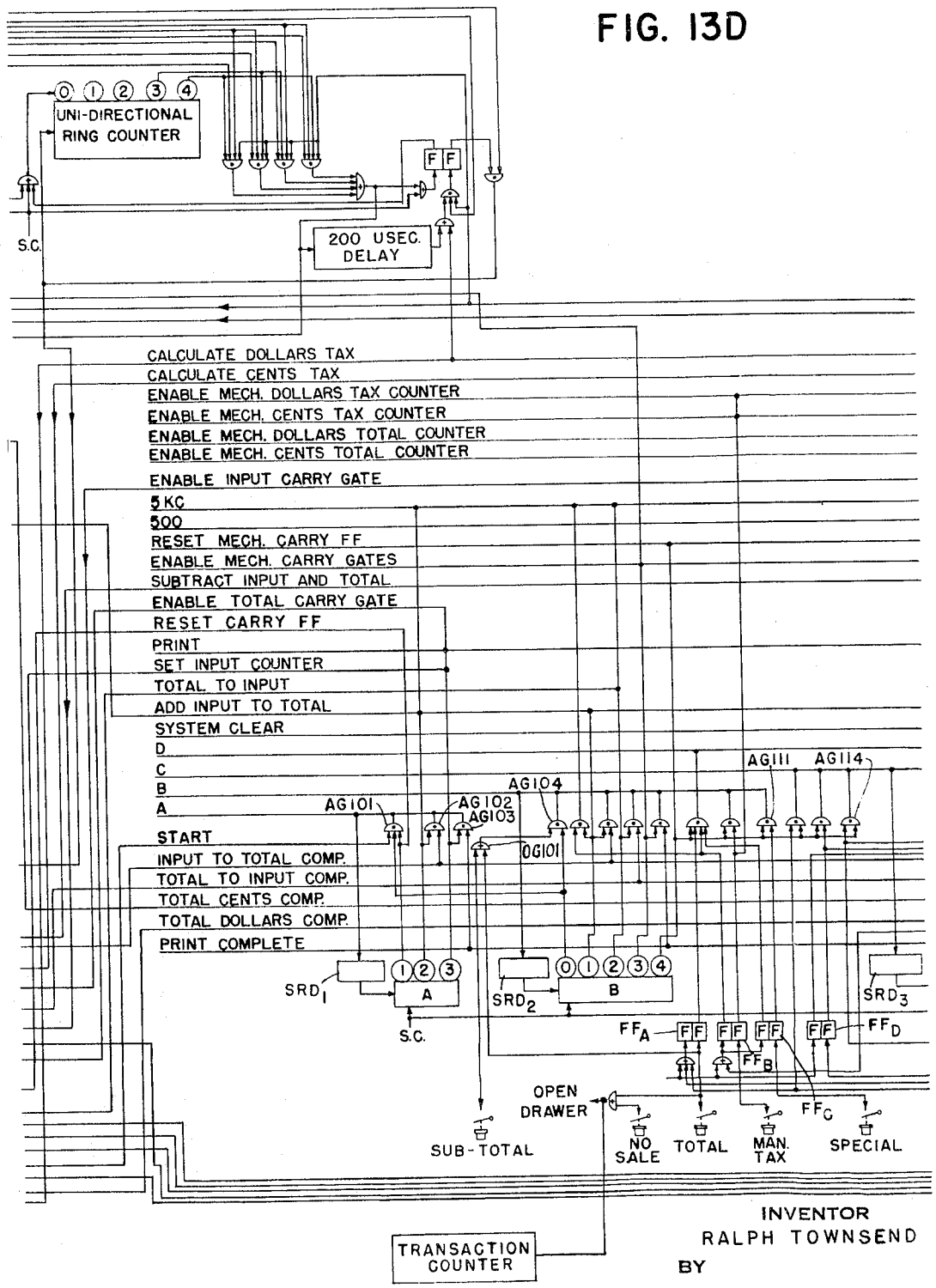

The basic registers are made up of four bidirectional ring counters each, which preferably are of the electronic bidirectional type, such as disclosed in the patent of Marvin Felcheck, No. 3,248,562, issued Apr. 26, 1966. As shown in FIGS. 3, 13B and 13C, the bidirectional ring counters are connected in pairs to provide a cents pair and a dollars pair in the Input Register and in the Total Register. Carries are connected within each cents pair and each dollars pair, but no carry is directly connected from the 10¢ counter to the unit dollars. Separate input lines may be provided for add and subtract on the unit cents and unit dollars counter.

Register Output Gating

During the transfer of information within the ring counters of the Registers, voltage pulses are present on all of the output lines and output gates in these lines are therefore disabled during the stepping of the ring counters and enabled at rest times. Enabling is accomplished by gating techniques as described in the co-pending U.S. application of W. J. Mahoney and N. N. Murphy, Ser. No. 273,347, filed Apr. 12, 1963, under the sectional heading "Output Gating" in the specification and illustrated in FIG. 4 thereof.

Briefly, this technique involves placing a switch in series with the gate resistors through which current must flow to read out of the gates. When the series switch is open the gate cannot conduct current and is therefore disabled. This series switch is a transistor which is turned "on" and "off" as a function of the ring counter drive pulses. It is "on" at rest times and "off" during information transfer.

The principal features of the electronic circuit arrangements of the system or machine of the invention, the complete circuit schematic or logical diagram of which is shown in FIGS. 13A to E in combination to be described later, may best be described in connection with the simplified circuit and/or block diagrams of FIGS. 3 to 5, 7, 10 and 11, and FIGS. 6 and 9 illustrating the timing and oscillator waveforms used in connection with the description of operation of some of these features.

FIG. 3 illustrates in block schematic form a portion of the register transfer block used to transfer price information stored in the Input Register IR under control of the item keys on the keyboard of the machine through the associated adjustable price board APB. Each of the bidirectional ring counters in these registers has a decade configuration of 0 to 9 positions or stages electronically equivalent to a bidirectional stepping switch indicated diagrammatically by the usual coaxial ring symbol. Each depression of an item key, for example, through the adjustable price board, will cause the transmission of a pulse to the ring counter and cause a stage to be energized. Of the ten output positions any one will store an output voltage at any time constituting a memory representing the price of the item ordered.

An AND gate AG3, which AND's together the zero storage signals of ring counters IR1 and IR2 is enabled by an enabling pulse via OR gate OG1. The enable signal is 180° out of phase with the output of the selective oscillator SO (FIG. 8) which drives the cents ring counter IR1. The enable signal is a pulse, so, in effect, the ring counters gates are sampled.

*Transfer of information from Input to Total Register (Add)*

As shown in FIG. 3, the Input Register includes a cents ring counter IR1 and a 10 cents ring counter IR2. It is assumed that IR1 has been set to the No. 5 position and IR2 to the No. 2 position, corresponding to a price of 25 cents, under control of the item keys through the price board APB. The 25 cents is transferred out of the counter IR1 into the Total Register TR, which includes a cents ring counter TR1 and a ten cents ring counter TR2, as well as a dollar and a 10 dollar ring counter (not shown in this drawing), in the following manner:

In the reset condition, a flip-flop FF1 is reset, and disables an AND gate AG1 and enables AND gate AG3 via an OR gate OG1. Since there is a number in the Input Register IR, the signals from IR1 and IR2 to AG3 are "zeros" and the outputs of an amplifier A2 are also at the zero level. Therefore, an AND gate AG4 is disabled and the AND gate AG2 is one-half enabled via an inverter I2 acting on the zero signal from amplifier A2. To "start" the transfer cycle, the "start" signal, normally at its zero level, changes to "one" which acts to set the flip-flop FF1 via AND gate AG2 and an amplifier A3, and causes gate AND AG1 to be one-half enabled. The pulse oscillator SO (FIG. 8) connected to one input thereof now begins to pass its signal pulses through AG1 and amplifier A1 to begin the counting down of the IR1 and IR2 counters in the Input Register. The signals in the output of AG1, which cause the counting down of the Input Register (the output of AG1), also acts to count up the Total Register counter (TR1) via an amplifier A4.

The AND gate AG3 is now being enabled via OR gate OG1 by an enable signal of short duration at the same frequency as, but out of phase with, the oscillator signal. After 25 oscillator pulses have passed through AG2, IR1 and IR2 are at their respective zero stages or positions, and the enable pulse causes AND gate AG3 to emit a "one" pulse which resets flip-flop FF1 via amplifier A2. AND gate AG1 is now disabled and the oscillator pulses can no longer cause a count in the Input and Total Registers. Since the "start" signal and the output of A2 are both at the "one" level, the AND gate AG4 passes a signal which indicates the cents transfer is complete.

The reason for the FF1 enable signal to AG3 is now evident for, if it were not required, AG3 would emit a series of "one" pulses at the enable frequency. Because of system considerations, only one D.C. level change is desirable to indicate the cents transfer is complete.

The information transfer from the Input Dollars Register to the Total Dollars Register of the machine of the invention is effected in a similar manner. Therefore, the Input Dollars and Cents Registers may transfer their information simultaneously to the respective Total Registers. It is necessary to AND together the "Cents Complete" and the "Dollars Complete" signals produced by AND gate AG4 and the similar AND gate in the dollar register and to use the resulting signal to indicate completion of Input to Total Register transfer, as shown in FIGS. 13A and 13B.

The carry pulse which may ensue from the Total Cents Register in the event of a cents count passing through 99 is stored in a Total Carry flip-flop $FF_{TC}$ (shown in FIG. 13C) and gated into the Total Dollars Register at some later time.

In the event that the Input Register contains no information and a "start" signal occurs, a quick complete signal passes through AND gate AG4. This is accomplished via the output AND gate AG3 and the FF1 enable signal being at "one" in the reset condition.

The same technique as described above is used in transferring price information from the Total Register to the Input Register. It will be referred to as either "ADD from Input to Total Register" or "ADD from Total to Input Register" (see Table I).

*Setting the Input Register*

Figure 4:
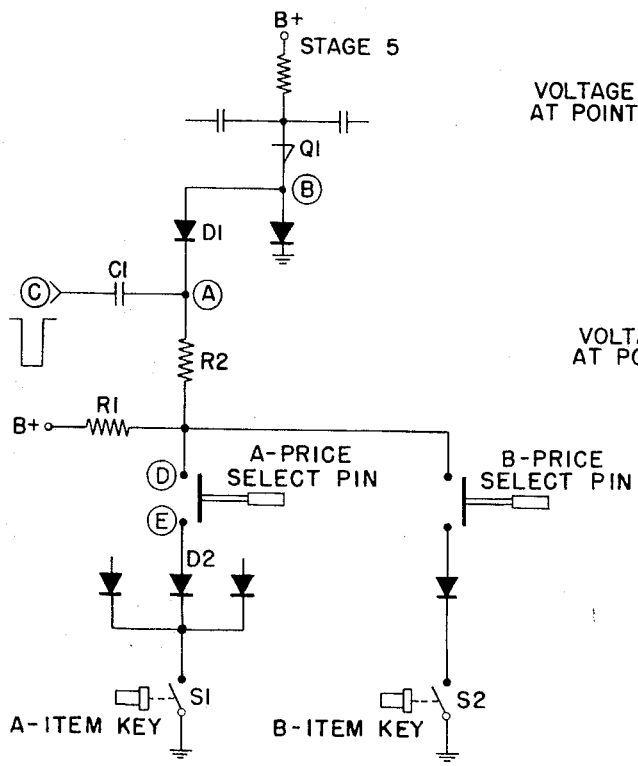
FIG. 4 is a diagram of a portion of the circuit arrangement or adjustable price board for setting an item price into the Input Register of the electronic control circuits of the machine under control of an item key.
Figure 4A:
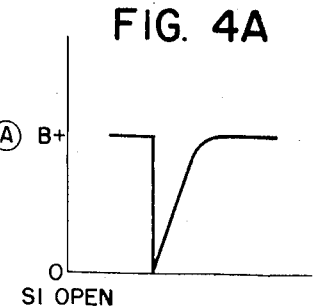
FIGS. 4A and 4B are curves used in connection with the description of operation of the arrangement of FIG. 4.
Figure 4B:
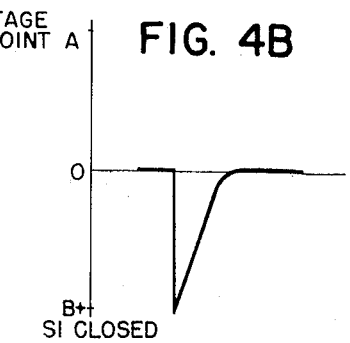

During the inserting of Item information into the machine, the previous information or item in the Input Register is shifted and added to the Total Register. At some later time, the item being entered into the machine is entered into the Input Register. The closure of an item key starts the A cycle (Table I) which is used for item entry. FIG. 4 shows how an item key determines which price is set into the Input Registers. Point (D) is the enable point for the fifth stage of a particular ring counter which could then correspond to either 5 or 50 cents, or 5 or 50 dollars, depending upon which of four ring counters in the Input Register is chosen. To pre-establish the price associated with an item key, up to three pins are inserted in the price matrix of the associated adjustable price board. Each pin would choose a gate in one of three input ring counters. When the pin is inserted, points (D) and (E) are shorted thereby establishing a certain price (one digit of it) for that item key. After any item key is depressed a set pulse is inserted at point (C). If switch S1 is open, point (A) is held at B+ potential, reverse biasing diode D1. The set pulse passing through capacitor C1 being B+ in magnitude cannot overcome this reverse bias, and a signal never passes through D1 to set the fifth stage or position of the ring counter. If S1 had been closed, then point (D) is clamped to ground via D2 and the voltage at point (A) goes B+ volts below ground when the set pulse passes through C1. This forward biases D1 and passes a pulse to point (B). This negative pulse acts to activate the fifth stage or position of the ring counter. The voltage of point (A) with the switch S1 open or closed is shown by the curves of FIG. 4A and FIG. 4B, respectively. The diode D2 is an isolation diode, so that many items can have the same digit in their prices. When the manual entry input keyboard in the machine is used, no isolation diode is necessary since a separate switch is used for each ring counter gate.

The Multiplier

To facilitate the entry of a number of single items on each order, a multiplier is added as an option to the machine. The multiplier works in conjunction with the A cycle Register (Table I). The basic function of the A cycle is to enter items into the Input Register IR.

Figure 5:
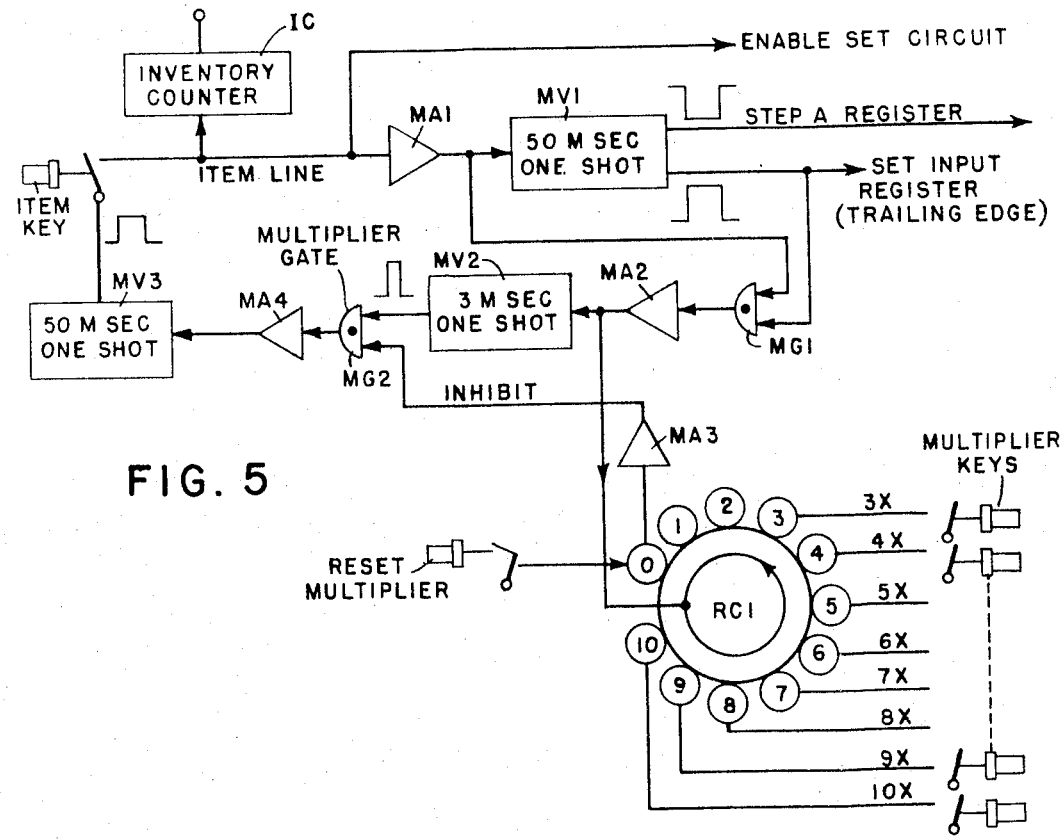
FIG. 5 is a block of the building blocks comprising the optional multiplier arrangement.
Figure 6:
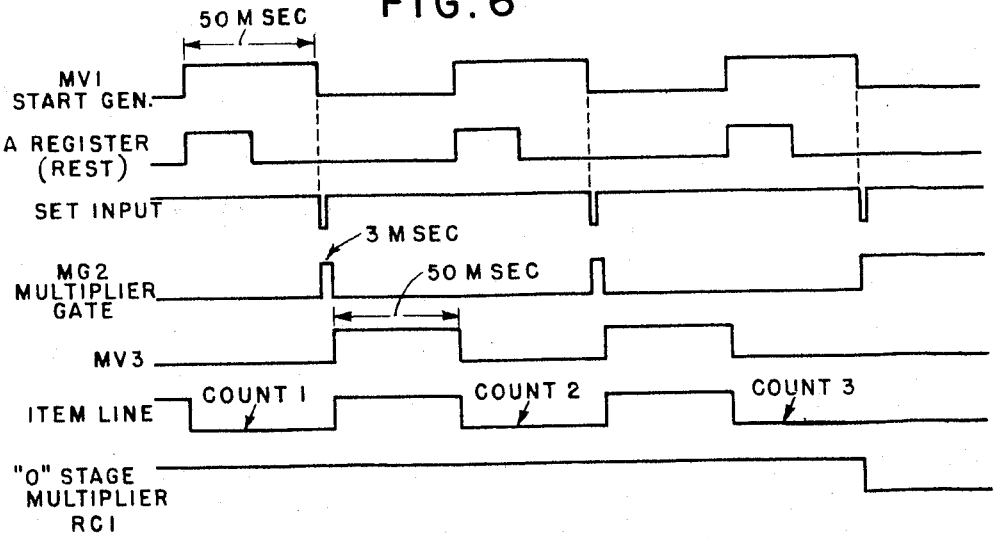
FIG. 6 is an illustration of timing waveforms used during the multiplier cycle (for 3 items)

FIG. 5 shows the building blocks comprising the multiplier and FIG. 6 shows the timing waveforms during the multiplier cycle. When it is desired to use the multiplier, one of the multiplier keys (3 to 10) is depressed setting the ring counter, say, RC1, for the number of items desired (i.e., for 3 items, stage or position No. 3 of the counter is set). To start the cycle, the item key is depressed and held down until the completion of the cycle. (If the item key is lifted before the completion of the cycle, then depressing the item key again will complete the cycle with no errors in calculation). Referring to FIG. 5, when the item key is depressed the inventory counter IC (where this option is provided) for that item is stepped, the set circuits for the Input Register IR are enabled, AND gate MG1 is one-half enabled, and multivibrator MV1 (50 msec., one-shot) is triggered via amplifier MA1. The normally "zero" output of MV1 (zero is high voltage) acts to step register A and the normally "one" output acts to "inhibit" AND gate MG1. The A-Register goes through its normal (Input to Total) transfer cycle. When MV1 concludes its 50 msec. active state it sets the Input Register and enables the other half of MG1. The output of MG1 triggers MV2 and steps RC1 one step back toward zero. The output of MV2 inhibits MG2 for 3 msec. so that if RC1 is stepped back to zero the output of MA3 will then inhibit MG2 so that no pulse is sent to MV3. If RC1 is not stepped to zero, MV3 will be triggered after a 3 msec. delay. The output of MV3 (50 msec. positive pulse) acts through the closed item key exactly as if the item key had been opened for 50 msec. and then again depressed. The cycle again repeats until stopped by RC1 being stepped to zero and inhibiting MG2 via amplifier MA3.

The time delays of MV1 and MV3 are selected to be 50 msec. each so that the maximum speed of the inventory counters never exceeds 10 counts per second. For a multiplier cycle of 10 times, the time required is approximately 1 second.

Change calculation and mechanical total

Because of the bidirectionality of the Input and Total Register, many operations become fairly simple, such as change calculation. To calculate change, the amount tendered by the customer is placed in the amount keyboard by depression of the necessary amount keys and the change key is then depressed. The bill or check total is placed in the Total Register TR and the amount tendered in the Input Register IR. Both registers are counted down simultaneously. When the Total Register TR is counted down to zero, the process is stopped and the amount remaining in the Input Register is the difference between the tendered amount and the check total, or the change.

As the Total Register TR is counted down (both dollars and cents simultaneously), the cash total in the mechanical accumulator MA to be described later is stepped up by the same amount. Any mechanical carry pulse is stored in the associated mechanical carry flip-flop device $FF_{MC}$ and passed into the dollar accumulator of the mechanical accumulators at a later time (see FIGS. 7 and 13A to 13E).

The mechanical accumulators

Figure 7:
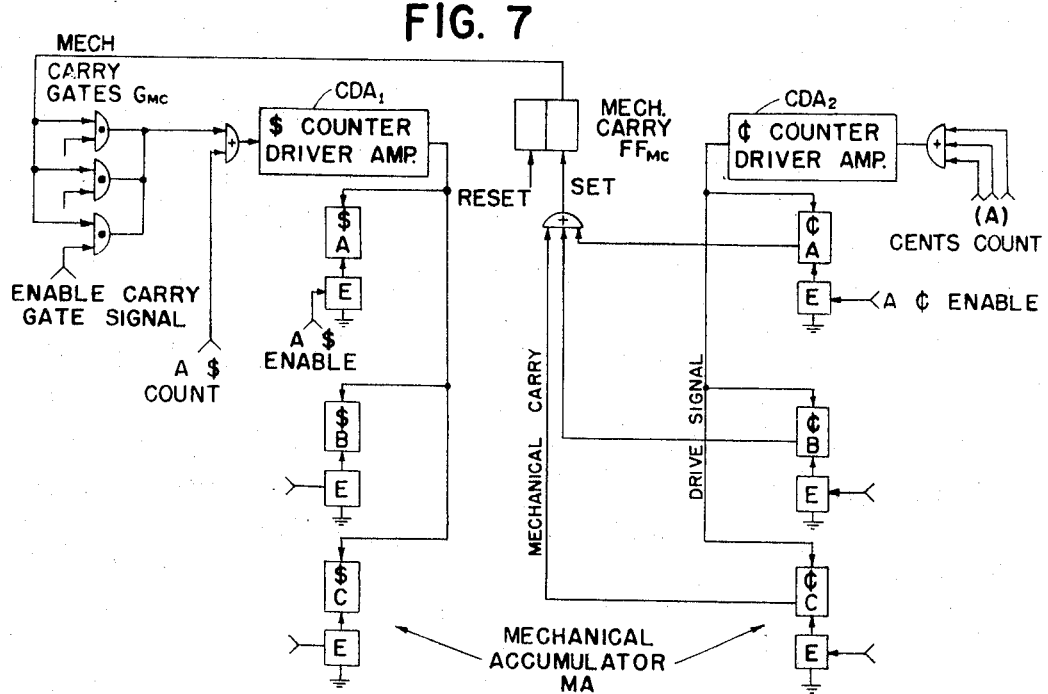
FIG. 7 is a black diagram of the mechanical accumulators and the carry flip-flop for accumulating Total Sales, Individual Waiter Totals, Tax Totals or other Total information in the system of the invention.

As one of the optional features of the machine, mechanical counters are provided to accumulate such information as Total Sales, Individual Waiter Totals or Tax Totals. Because of the normally relatively slow speed of the mechanical counters, the mechanical dollars and cents counters are to be counted simultaneously wherever possible. Any carries from the cents to the dollars is stored in an electronic flip-flop and passed into the dollars at some time other than when the dollars counter is being stepped. FIG. 7 is a block diagram of the arrangement used to time share the counter drivers (so that only two are necessary in the machine), and to handle the cents carry pulse.

The counter driver amplifiers $CDA_1$ and $CDA_2$ each supply a fixed width, positive pulse, as a drive signal for the dollars and cents section A to C of the mechanical counters MC respectively driven thereby. The enable circuit (shown by box E) functions as a switch which supplies a ground path for the counter drive coil of the counter amplifier. When a drive signal occurs, only those counters whose enable circuits have been activated will be stepped.

To understand the circuit operation, assume that $9.50 is the amount to be entered in the A counters which presently contains the number 65 and the A dollars counter the number 15. The enable circuits E for both A counters are activated. Pulses are fed into the cents and dollars counter driver amplifiers $CDA_1$ and $CDA_2$ simultaneously, 50 pulses into the cents amplifier and 9 pulses into the dollars amplifier. The A cents counter is stepped to 15 with a carry ensuing when the counter passes through 00. The mechanical carry flip-flop $FF_{MC}$ is set enabling one-half of the mechanical carry gates $G_{MC}$. The A dollars counter is stepped to 24. The count in the A counters is now $24.15 with the carry stored in the mechanical carry flip-flop $FF_{MC}$. An Enable Carry Gate signal now occurs which passes a single pulse through the carry gate $G_{MC}$ which adds one to the A dollars count. The final and correct count in the A counters is now $25.15. The reason for driving the dollars and cents counters simultaneously is to achieve time saving. If a single A counter with 4 or 5 digits was used, then 950 pulses would have to be added to the counter. With separate dollars and cents counters and simultaneous pulsing the time is determined by the 50 pulses passed into the cents counter.

The selective oscillator

Because of the many functions and operations performed by the machine, several frequencies of operation are desirable and necessary for the various operations.

Figure 8:
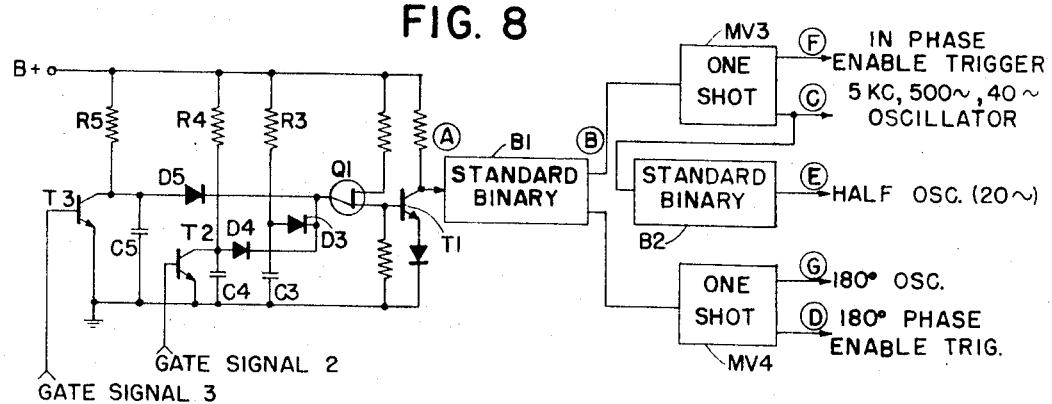
FIG. 8 is a circuit diagram of one type of selective oscillator which may be used for providing the various frequencies used in the optional automatic tax cycle and other electronic control circuits of the machine of FIG. 1.
Figure 9:
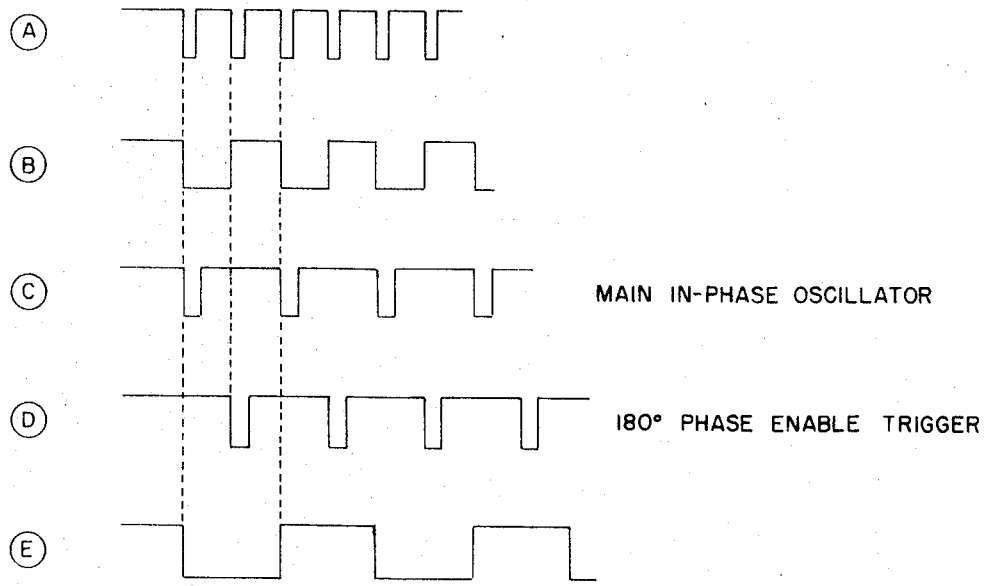
FIG. 9 illustrates the selective oscillator waveforms provided by the oscillator of FIG. 8.

To obtain these various frequencies, the desirability of a single oscillator, each frequency of which can be selected by a gating signal as against several oscillators, is readily apparent. FIG. 8 shows one type of selective oscillator SO which may be used in the machine to obtain frequencies of 5 kc., 500 cycles, 40 cycles and 20 cycles. Also provided is the enable trigger pulse which is used to complement the oscillator 180° signal pulse in the automatic tax system. FIG. 9 shows the various wave-forms which can be produced by this selective oscillator.

The components of the selective oscillator SO and their connections will be described in the following description of its operation. Q1 is a unijunction transistor to which the timing circuits R3C3, R4C4 and R5C5 are connected. With both transistors T2 and T3 in the unoperated condition, the capacitor C5 is charged from the associated direct current source B faster than either capacitor C3 or capacitor C4 because of its nearer location to that source. Therefore, Q1 fires repeatedly according to the time constant of R5C5. The signal produced by Q1 is amplified by transistor T1 and the amplified wave used to trigger the binary B1 causing it to give at (B) a square-wave output at one-half the R5C5 frequency, as shown by the uppermost curve of FIG. 9. The two outputs of the binary B1 are used to trigger the one-shot multivibrators MV3 and MV4, respectively, to produce outputs which are respectively 180° out of phase. The (C) output from MV3 is used to trigger a second binary B2 which operates to produce at its output (E) a half frequency square wave (20 cycles). At output (C) of multivibrator MV3, the main oscillator output of frequencies 5 kc., 500 cycles or 40 cycles is available; at the output (D) of multivibrator MV4, the out-of-phase 180° signal to the main oscillator; and at point (F) and (G), the respective complementary signals (see FIG. 9). The binaries B1 and B2 may be preferably of any of the standard electronic types.

To change the frequency, transistor T3 is turned on by a gating signal 3 shorting the capacitor C5. The R5C5 timing combination is now isolated by diode D5, and the frequency is determined by timing circuit R4C4. If both T3 and T2 are turned on by other gate signals, respectively, the frequency is determined by timing circuit R3C3. As many frequencies as there are gating networks therefore can be obtained.

The selective gate sampler

Figure 10:
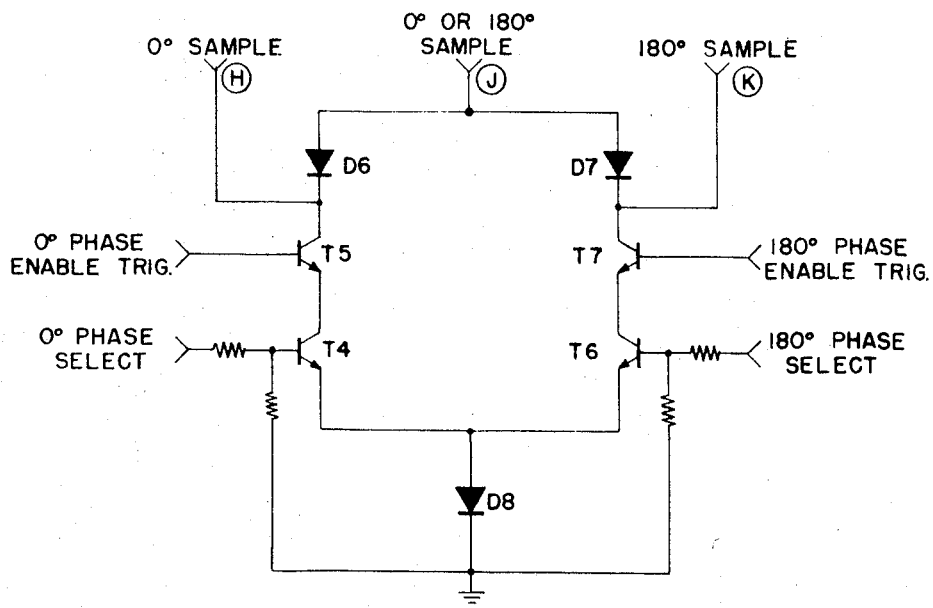
FIG. 10 is a circuit diagram of a selective gate sampler which may be used for "sampling" a gate in the system of invention.

In the system of the invention, it is desirable to "sample" a gate at some time other than when the inputs are changing. Because of system requirements, the gates may be sampled in phase or out of phase with the main oscillator signal. One circuit for accomplishing such selective sampling is shown in FIG. 10. In this circuit, the transistors T5 and T7 are alternately turned "on" for 50 μseconds by the 0° phase and 180° phase enable trigger signal produced at point (C) and (D) of the selective oscillator of FIG. 8. If it is desired to have the 0° sample, transistor T4 is turned on and the 0° sample output occurs at both points (H) and (J). The 180° sample will occur at (K) and (J) when transistor T6 is turned on instead of T4. Diodes D6 and D7 allow isolation so that only (H) or (K) is active while (J) is active.

Tax calculation

Figure 11:
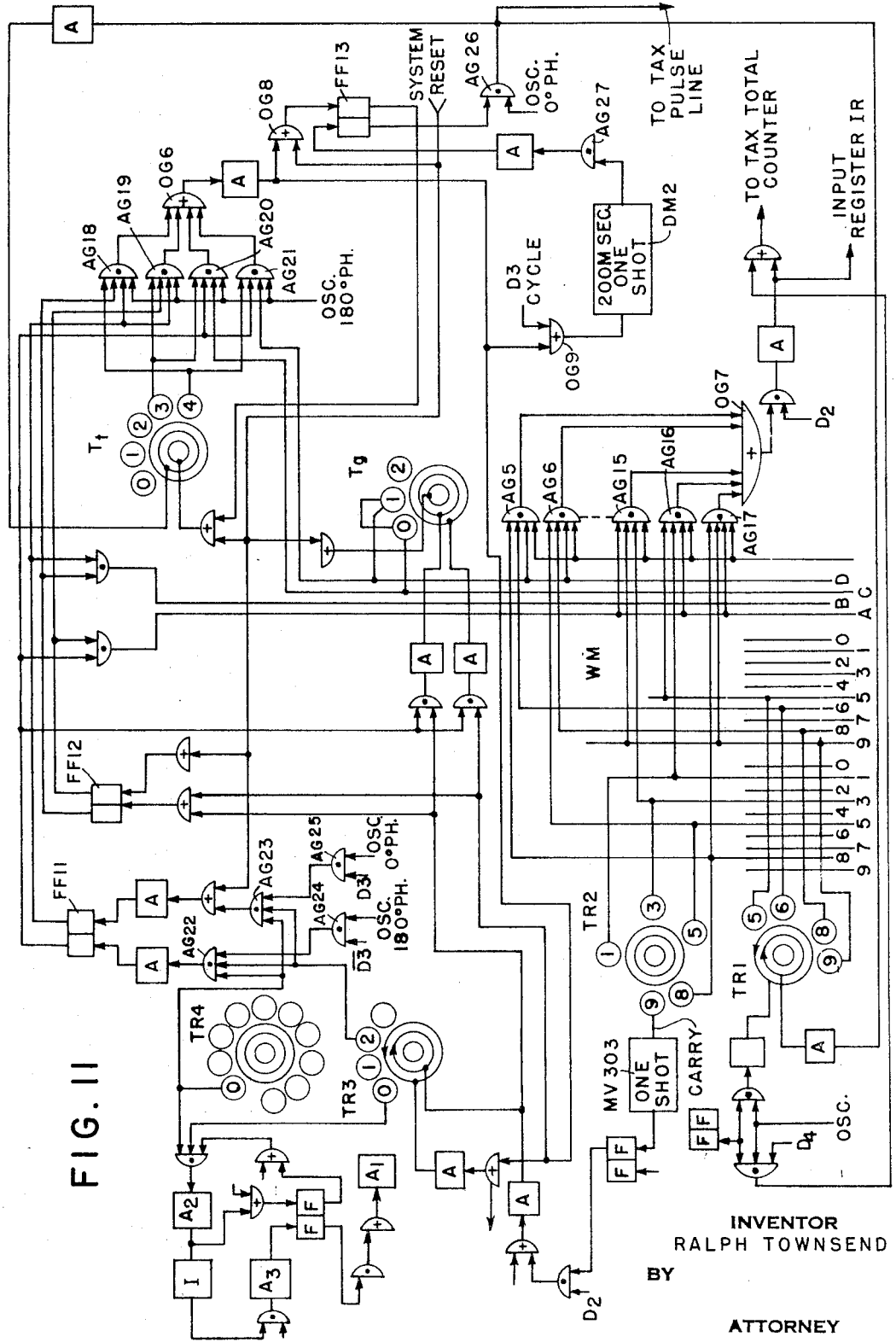
FIG. 11 is a simplified block schematic of the circuit used for calculation of sales tax.

FIG. 11 shows a simplified version of the overall logical circuitry of the machine of the invention, which is concerned with the calculation of sales tax. In the description following, only the more important control apparatus will be specifically referred to by characters or numbers.

Referring to FIG. 11, TR1 and TR2 are the bidirectional cents and ten cents ring counters in the Total Register; similarly, TR3 and TR4 are the bidirectional one and ten dollar ring counters in the same register. The flip-flop FF11, controlled from the dollar ring counters TR3 and TR4 through AND gates AG22 and AG23, changes state when the dollars counters reach $2 and remains in this state for higher dollars but reverts to its original state when counting down past $2. The flip-flop FF12 controlled from the Total Register counts in binary in step with the dollars ring counters and indicates whether the amount therein is 0 or $1, and this also occurs when TR3 and TR4 are counting either in forward or reverse. Ring counter $T_g$, controlled from the output of the ring counters in the Total Register, is a multi-step bidirectional counter which, as shown diagrammatically, is arranged by a feedback loop so that it counts up to two or three steps, for example, 0, 1, 0, 1, etc., or 0, 1, 2, 0, 1, 2, etc.

The input terminals of a group of multi-input AND gates AG5, AG6, . . . AG17, respectively, representing different tax breaks under the tax laws of the particular region are respectively connected to bus wires in a wiring matrix WM by an appropriate pre-set wiring arrangement. This may be a printed circuit wiring arrangement which can be plugged in to connect for the appropriate tax law, having several columns of parallel conductors with cents and 10 cents portions which are, in turn, connected to appropriate output connections of the cents and 10 cents ring counters TR1 and TR2. These gates (AG5 to AG17) fall into four groups which are controlled by enabling lines A, B, C and D, themselves by the connection shown controlled by the outputs of FF11, FF12 and $T_g$, of which only one is active at one time. Thus, line A is active when the dollars counters TR3 and TR4 contain $00., line B is active when TR3 and TR4 contain $01., line C is active when TR3 and TR4 contain $02., 04., 06., 08., 10., . . . etc., and line D is active when TR3 and TR4 contain $03., 05., 07., 09., 11., 13., . . . etc.

The value of the tax break depends upon the particular value of the connections to the ring counters TR1 and TR2.

The outputs of the group of AND gates AG5, AG6, AG7 . . . are respectively connected to a different input of the OR gate OG7 the single output of which is connected through other gating means and amplifiers to the tax line leading to the tax cents mechanical counters in the mechanical accumulator MA of the system, and to the cents bidirectional ring portions of the Input Register IR.

The input terminals of four additional multi-input AND gates AG18, AG19, AG20 and AG21, respectively, representing different tax breaks in the dollar portion, are connected through other buses in the wiring matrix WM to respectively different outputs of FF11 and FF12 and $T_g$. The single outputs of the gates AG18 to AG21 are connected to different inputs of the OR gate OG6 the output of which is connected through amplifiers and other gating means (OG8) through the flip-flop FF13 and another AND gate AG26 to the tax pulse line.

The functions of the unidirectional ring counter $T_t$, other gating devices and the delay multivibrators controlling the operation of the elements of the tax calculating system described above will be brought out in the following detailed description of the operation of that system in connection with a typical sale.

The first operation is to transfer the sub-total which is in the Input Register IR and being displayed in the visual indicator VI, to the Total Register TR in the manner which has been described in connection with FIG. 3. Referring to the Program (Table I), the D counter steps from the D0 to the D1 portion of the D cycle in the operation of the machine, and the total amount standing at this time in the Input Register is transferred to the Total Register. At the same time that the dollars amount is transferred to TR3 and TR4, FF11 is set if the amount exceeds $02.00, FF12 is counting in binary and is set 0 or 1 respectively when the dollar amount is odd or even. $T_g$ is also counting and in this case is also at 0 or 1 depending upon whether the dollar amount is odd or even. If, however, the tax laws had been such that the tax breaks repeated over a $3 cycle, $T_g$ would have been 0 for $00.00, $03.00, $06.00, $09.00, etc.; 1 for $01.00, $04.00, $07.00, $10.00, etc.; and 2 for $02.00, $05.00, $08.00, $11.00, etc.

The Connecticut state sales tax will be used as an example. A portion of it is shown in the following table:

| Sale | | Tax (Cents) | Sale | | Tax (Cents) |
|---|---|---|---|---|---|
| From | To | | From | To | |
| $0.15 | $0.38 | 1 | $5.29 | $5.57 | 19 |
| 0.39 | 0.64 | 2 | 5.58 | 5.85 | 20 |
| 0.65 | 0.88 | 3 | 5.86 | 6.14 | 21 |
| 0.89 | 1.18 | 4 | 6.15 | 6.42 | 22 |
| 1.19 | 1.57 | 5 | 6.43 | 6.71 | 23 |
| 1.58 | 1.85 | 6 | 6.72 | 6.99 | 24 |
| 1.86 | 2.14 | 7 | 7.00 | 7.28 | 25 |
| 2.15 | 2.42 | 8 | 7.29 | 7.57 | 26 |
| 2.43 | 2.71 | 9 | 7.58 | 7.85 | 27 |
| 2.72 | 2.99 | 10 | 7.86 | 8.14 | 28 |
| 3.00 | 3.28 | 11 | 8.15 | 8.42 | 29 |
| 3.29 | 3.57 | 12 | 8.43 | 8.71 | 30 |
| 3.58 | 3.85 | 13 | 8.72 | 8.99 | 31 |
| 3.86 | 4.14 | 14 | 9.00 | 9.28 | 32 |
| 4.15 | 4.42 | 15 | 9.29 | 9.57 | 33 |
| 4.43 | 4.71 | 16 | 9.58 | 9.85 | 34 |
| 4.72 | 4.99 | 17 | 9.86 | 10.14 | 35 |
| 5.00 | 5.28 | 18 | | | |

It shows that the cents part of the tax amount charged on sales follows a regular pattern above $2, and repeats itself at every even dollar; and below $2 the tax breaks do not follow a regular pattern. A study of the tax systems throughout the United States indicates that a similar pattern is followed in most of the states. Up to $1 or $2, the tax breaks are irregular; and above $2 the tax breaks follow a pattern which repeats itself every dollar, two dollars or in rare cases three dollars.

The flip-flop FF11 indicates the change from irregular to regular breaks and flip-flop FF12 indicates whether the amount is between 0 and $1 or $1 and $2. The step ring counter $T_g$ controls the repetitive cycle above $2 which may repeat over $1, $2, or $3 intervals depending on the state law being applied, and it is prewired accordingly. Preset wiring also controls the point at which FF11 is set.

Assume the Connecticut sales tax is being calculated and that the total amount of the bill is $5.79, so that 79¢ is stored in TR1 and TR2, $5 in TR3 and zero in TR4. The flip-flop FF11 is set to the "1" state via the left-hand gate AG22 through AG24 enabled by $\bar{D}3$ (not D3) of the associated selective oscillator SO, because the amount is more than $2. The flip-flop FF12 is set to the "1" state (odd dollars); and $T_g$ is connected to count 0, 1, 0, 1, and is in the "1" state.

At completion of the transfer to the Total Register TR, the D counter of the Program (Table I) steps to D2. In this step, the total cents ring counters TR1 and TR2 in the Total Register are counted down to zero, and the contents (79¢) are transferred back to the Input Register cents counters. As the value in TR1 and TR2 passes through each break, in this case (5) .58, (5) .29, a tax gate selected by FF11, FF12, and $T_g$ is enabled sending a tax pulse through the large OR gate OG7: (a) to the Input Register cents where it is added to the total (in between the pulses for the regular total being transferred back); and (b) to the tax cents total counter in the mechanical accumulator MA. The speed of counting TR2 and TR1 is 500 c.p.s., so that tax pulses issue at approximately 1/30 of this speed, or about 17 c.p.s. which is compatible with the mechanical speed of the tax total counter.

When TR1 and TR2 have reached zero, the D counter steps to D3 of the cycle (Table I), in which the tax on the dollar portion is calculated. The ring counter $T_t$ made use of in this portion of the system is a 4-step unidirectional ring counter (or more steps if sales tax rises above present levels) which has the function of counting out the number of tax pulses (equivalent to one cent) in each dollar amount (in this machine, this is made a maximum of 4 cents). The ring counter $T_t$ is preferably of the electronic type disclosed in the patent of W. J. Mahoney and N. Murthy, No. 3,235,748, issued February 15, 1966, which has a single active element, such as a 4-layer diode for each digit. The number of cents counted out are controlled by the gates AG18, AG19, AG20 and AG21, which are themselves controlled by flip-flop FF11, FF12, and ring counter $T_g$.

In the present case, it is desired first to issue the tax for between $4 and $5, and consulting the Connecticut schedule, this is seen to be 4 cents ($5.00, $4.72, $4.43 and $4.15). Because FF11 is set, this enables gates AG20 and AG21. Because $5 is odd, gate AG21 is enabled. Cycle D3 initiates a start pulse which is transmitted through the OR gate OG6 and fires one-shot (delay 200 μs.) multivibrator DM2 and through AND gate AG27 sets flip-flop FF13. This enables the applied oscillator timing pulses to pass through gate AG26 and to be transmitted over the tax pulse line. These pulses are also counted up in the total cents counters TR1 and TR2 of the Total Register, now cleared of their previous contents. Simultaneously, these pulses are counted in $T_t$, and when $T_t$ reaches position No. 4, the gate AG21 is enabled and an oscillator timing pulse passes therethrough to reset flip-flop FF13. This pulse also resets $T_t$ to 0, counts down dollars counters TR3 and TR4 in the Total Register and shifts $T_g$ to the "0" state. The delay multivibrator DM2 is fired, and the process starts again for the tax breaks between $4 and $3. The time gate AG20 is enabled by $T_g$ and three tax pulses are counted out.

This procedure is repeated until $2 is reached, when the flip-flop FF11 is reset to 0, enabling gates AG18 and AG19. Under this condition, these tax breaks are selected by FF12 for $1 and 0. The procedure is then the same as before. Finally, the total dollars counters TR3 and TR4 reach zero and this step in the cycle ends. The tax on the dollars part of the total is now stored in the total cents counters TR1 and TR2. This is done because the operation must be performed at 500 cycles per second to be fast enough (maximum tax calculation on dollars is 200 msec.). The tax pulses issue too fast for an electromechanical tax total counter to operate correctly, and, therefore, have to be stored electronically before transferring at a slower rate to the electromechanical counter.

The final step D4 in the D cycle is now to transfer the tax on the dollars from TR1 and TR2 into the tax total counter and into the Input Register IR at 40 c.p.s.

To summarize the procedure of tax calculation, the first operation is to transfer the sub-total which is in the Input Register, and being displayed on the visual indicator, to the Total Register. Then, the cents part of the sub-total is acted upon. Tax on the cents is calculated, and this information is stored in the mechanical cents tax counter. The original sub-total cents plus the tax on it is now stored in the cents part of the Input Register. Any carry passes directly into the units dollars of the Input Register. The tax on the dollars is now calculated. The tax information is stored in the cents counter of the Total Register. These counters had been previously cleared during the calculation of the tax on cents. The original sub-total dollars are now in the Input Register, and the tax on the dollars in the cents part of the Total Register. The total cents (tax on dollars) are now transferred to the Input Cents Register and the mechanical cents tax counter. The number in the Input Register is now the sub-total plus tax.

Figure 12:
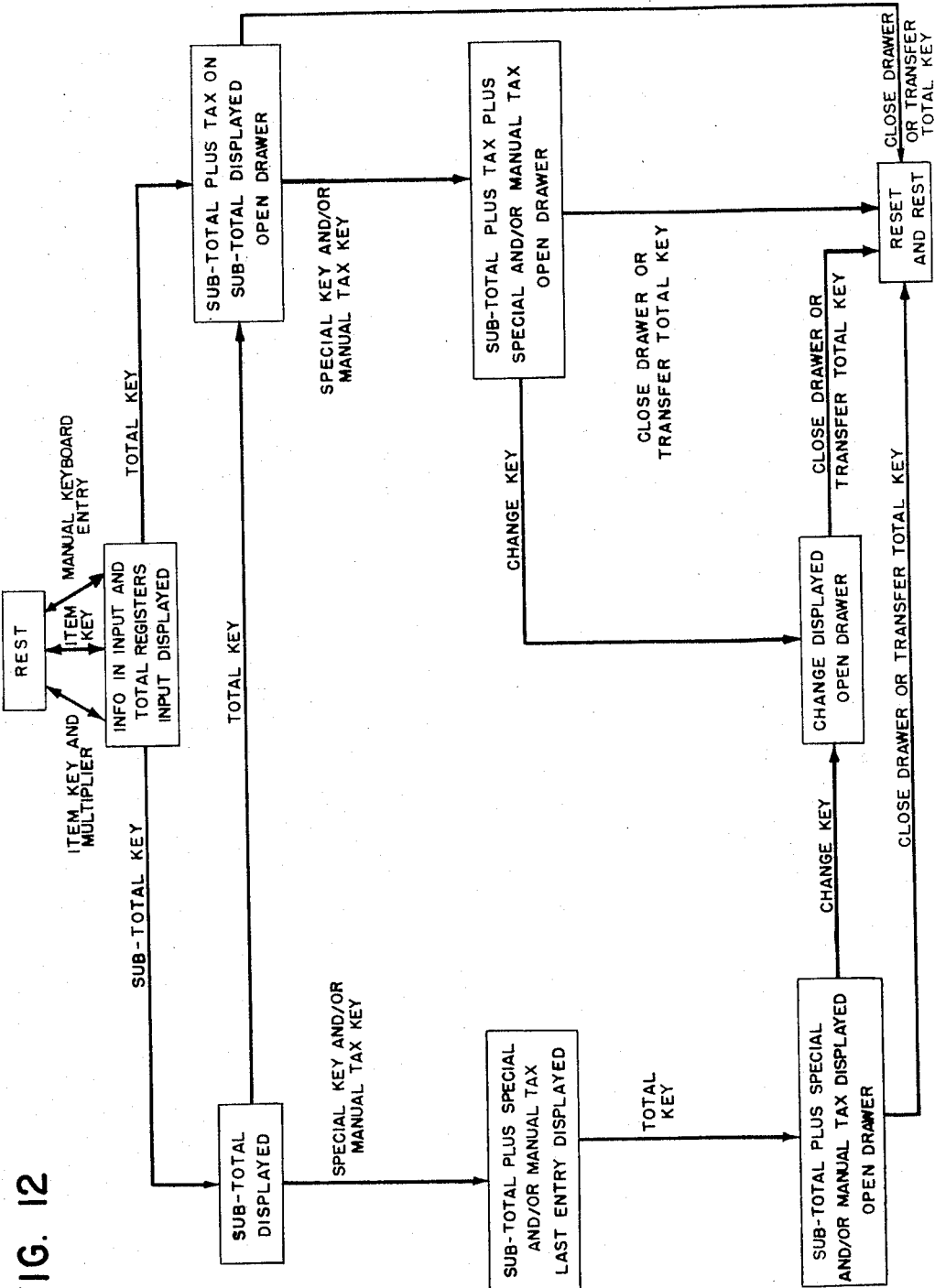
FIG. 12 is an operation flow chart of the machine of the invention.

The sequence of operations performed by the machine to obtain the desired results may be called the Program. This is divided into separate cycles: (a) the Entry Cycle which occurs after each item quantity is entered, and (b) the Computer and Print Cycles which are performed at the end of a bill to compute tax, print tax and subtotal, and total, and to compute and print the change. The program is tabulated in a terse form in Table I for convenience when determining the operation of each step. The operation will be described in more detail later with reference to the operation flow chart in FIG. 12 and the main logical diagram of FIG. 13.

TABLE I

*Program (see FIGS. 12 and 13)*

Cycle A—item entry:

A–1  Rest position.
           Start: Set by "Clear" or "Print Complete" and A–3.
           Operation: Reset Total Carry FF.
    A–2  Start: "Item Key Pulse" or "Amount Entry Key Pulse" or B–1.
           At: 5 kc. speed.
           Operation: Add from Input Register to Total Register.
    A–3  Start: "Input to Total Complete" signal and A–2.
           Operation:
              (1) Print;
              (2) Set Input Register through previously enabled set gates;
              (3) Enable Total Carry Gate.

Cycle B—Sub-Total and wait for instruction:
  B-0 Rest Position.
      Start: Set by "Clear," or B-4 and "Manual Tax" signal or "Special" signal (where these options are provided).
  B-1 Start: B-0 and Sub-Total or Total Key at speed of 5 kc.
      Operation: Start A Cycle—Add from Input Register to Total Register.
      (Note: If Total Key is depressed in Automatic Mode, Auto Tax FF is set).
  B-2 Start: B-1 and "Input to Total Complete" signal at 5 kc.
      Operation: Add from Total Register to Input Register.
  B-3 Start: B-2 and "Total to Input Complete" signal.
      Operation: Print, Enable Mechanical Carry Gate.
  B-4 Start: B-3 and "Print Complete" signal.
      Operation: Reset Mechanical Carry FF. Wait for Instruction.
      Enables:
          (a) Automatic Tax Cycle Gate.*
          (b) Manual Tax Gate.*
          (c) Special Item Gate.*
          (d) Start C Cycle Gate.*
          (e) Drawer Closure Gate.
          (f) Transfer Gate.
          * (If these options are provided).
    (a) Start: B-4 and "Auto Tax FF" signal.
        Operation: Start D Cycle (automatic tax).
    (b) Start: B-4 and "Manual Tax" key signal.
        Operation: Sets Manual Tax FF which inhibits Auto Tax Cycle Gate, enables Tax Counters, sets Oscillator for B-1 to 20 cycles.
        (Manual Tax is now entered through the manual entry keyboard via the A cycle. The Total key is then operated for the total.)
    (c) Start: "Special" key signal.
        Operation: Sets Special FF which sets B-0 and inhibits the Auto Tax Cycle Gate.
        (The special item is then entered through the A register and Total key activated for the total).
    (d) Start: "change" key signal.
        Operation: Start C register cycle (change cycle).
    (e) Start: "Drawer Closure" pulse.
        Operation: Start C Register cycle.
    (f) "Transfer Total" signal.
        Operation: Sets Transfer FF which starts C register cycle.
Cycle C—change calculation and enter totals in mechanical accumulators:
  C-1 Rest Position.
      Start: Set by "Clear" signal.
  C-2 Start:
          B-4 and "Change" key signal;
          B-4 and "Drawer Closure" signal;
          B-4 and "Transfer" signal.
      At: 40 cycles per second.
      Operation: Subtract Input and Total Registers. Enter Total Register information into Mechanical Total Counters. Reset "Manual Tax" FF or "Special" FF.
  C-3 Start: C-2 and "Total to Input Complete" signal.
      Operation: Enables Mechanical Carry Gates and Mechanical Dollars Total Counter—
          (a) "Drawer Shut" Gate;
          (b) "Drawer Open" Gate;
          (c) "Transfer Clear" Gate.
    (a) Start: C-3 and "Draw Shut" signal.
        Operation: System Clear.
    (b) Start: C-3 and "Drawer Open" signal.
        Operation: Print.
    (c) Start: C-3 and "Transfer FF" signal.
        Operation: System Clear.
  C-4 Start: C-3 and "Print Complete" signal.
      Operation: Enables "End of Cycle" Gate (will cause system clear if "Drawer Shut" signal occurs).
Cycle D—Automatic Tax:
  D-0 Rest Position.
      Start: Set by "Clear" signal or D-4 and "Total Cents Complete" signal.
  D-1 Start: "Auto Tax" cycle gate signal at 5 kc. speed.
      Operation: Add from Input to Total Register, Reset Auto Tax FF.
  D-2 Calculate Tax on Cents and Accumulate in Cents.
      Tax Mechanical Counter.
      Start: D-1 and "Input to Total Complete" signal at speed of 500 c.p.s.
      Operation: Enable "Mechanical Carry" Gate and enable Tax Cents Counter.
  D-3 Calculate Tax on Dollars and Store in Total Cents.
      Register.
      Start: D-2 and "Total Cents Complete" signal at speed of 500 c.p.s.
      Operation: Reset "Mechanical Carry" FF.
  D-4 Start: D-3 and "Total Dollars Complete" at speed of 40 c.p.s.
      Operation:
          Enable Dollar Tax Counter.
          Enable Cents Tax Counter.
          Enable "Mechanical Carry" Gate.

*General operation (see FIGS. 1, 2 and 12)*

When an item key is depressed, the price of the item appears on the illuminated indicators above the keyboard, and is removed when a second item key is depressed and the second item price appears on the indicator. This is continued until all the items are entered in the Input Register, at which time the sub-total key is depressed. The total of all the item prices now appears on the indicator. Depressing the total bar opens the cash drawer and the sub-total price plus tax appears on the indicator.

During the entry of the items on the order, if it is desired to enter an amount for a special item for which there is no item key, this amount can be entered through the amount keyboard by depressing the appropriate keys.

If several of a given item are to be entered on an order, the appropriate numbered multiplier key is depressed and the item key in the item keyboard is held depressed until the illuminated multiplier keys count down to zero, and the "Mulitplier On" light, which goes on when the multiplier key is depressed, counts down to zero when this light goes out. This will take no longer than about one second for a quantity of ten.

Special no tax or special tax items can be entered after the Sub-Total and prior to the Total by depressing the appropriate keys.

Normally, closing the cash drawer activates a reset of the electronic equipment to the initial condition which permits the next customer's bill to be entered. For those cases where there is no cash drawer or where it is purposely left open to speed up operations, a Total Transfer key is provided to reset when it is operated.

When change is to be computed, the amount tendered is entered on the amount keyboard after the total bar has been depressed. The change key is then depressed, and the amount of the change appears on the indicator.

If an associated printer is provided, all fingers appearing on illuminated indicator are printed by it plus a code identifying sub-totals, sub-total plus tax, special item, etc.

As each item is entered, its inventory counter is advanced so that a count can be kept of the number of units of each item dispensed. This same signal may be used to control automatic machines via a menu item memory (MIM), for example.

An overall cash total is maintained through a counter which is one of the mechanical counters. Optional tax totals or individual waiter totals can also be maintained via the mechanical counters. As previously stated, the item keys have provision for enabling changing of the legends applied thereto in case of a menu change and the unit price keyboard has provisions for quickly changing a group of prices on the individual item prices.

The complete circuits of the system of the invention including the optional features are shown in the overall schematic or logic diagram of FIGS. 13A to E in combination when arranged side by side in the manner shown in FIG. 14. As shown therein, the system includes a keyboard unit consisting of an item keyboard IK of up to 50 item keys or push buttons; an amount keyboard AK including a number of amount keys valued at 1¢ to $29.29 with an associated Manual Entry key; and a number of other functional keys including a Sub-Total, No-Sale, Manual Tax, Special, Total Transfer, Change and Clear.

The 50 item keys in the item keyboard IK are connected through individual buffer diodes BD to the adjustable or interchangeable price board APB which selects the item (or menu) prices. The price board APB, which may be a printed circuit wiring arrangement, comprises several columns of parallel wires representing respectively cents, ten cents, dollars and ten dollars. The adjustable arrangement of connections provided by pins or adjustable sliders on the price board APB connects these lines to the desired setting (output position) of the bidirectional ring counters IR1, IR2, IR3 and IR4 of the Input Register unit IR. Thus, when an item key is operated, the amount equivalent to the price of that item is entered directly into the item counters of the Input Register, which had been automatically cleared previously of input information in response to CLEAR signals generated by the CLEAR generator CG (FIG. 13E) under control of the CLEAR key through OR gate OG2. The manner in which the Item keys through the price board APB determine what price is set into the Input Register has been previously explained in connection with FIG. 4.

Each output position of the ring counters IR1, IR2, IR3 and IR4 of the Input Register is connected to a cents, ten cent, dollars or ten dollar portions of the visual indicator VI, so that the output voltages cause the total item prices to appear on the indicator as the item is rung up.

A separate output is taken from each output line of the ring counters IR1, IR2, IR3 and IR4 through individual buffer diodes (not shown) to the print wheels (FIG. 13B) of the associated printer (not shown). When the printing of the item prices on each order is completed, a signal is sent back from the printer to start the transfer cycle which consists of counting the ring counters IR1 to IR4 in reverse down to zero, and simultaneously sending pulses to the Sub-Total and Total counters. When the Item counter reaches zero, a transfer flip-flop device would be turned off—stopping the pulses, and the amount previously resting on the Item counter has now been added to both the Sub-Total and Total. Finally, the Item counter is cleared of the price information in the manner previously described ready for the next item to be entered.

Amounts for special items are entered directly from the amount keyboard AK by operating the amount keys thereof which are connected directly through the adjustable price board APB to the desired setting of the ring counters IR1 to IR4 in the Input Register and starts the price and transfer cycle.

The bidirectional ring counters TR1 to TR4 (shown in FIG. 13C) constitute the Total Register TR. The manner in which the price information is transferred to the Total Register from the Input Register has been previously described in connection with the simplified diagram of FIG. 3.

The multiplier unit MU (FIG. 13A) including the multiplier keys 2 to 10, the unidirectional ring counter RC1, the multivibrators MV1 and MV2 and the associated gates are connected to the Input Register IR. Its optional use to provide multiplication in the system, if desired, has been previously described in connection with FIG. 5.

The mechanical accumulator unit MA, the selective oscillator SO, the selective gate sampler SGS and the automatic tax calculation circuit ATC are other units shown in the system of FIGS. 13A to 13E, and their operations have been previously described in connection with the block diagrams of FIGS. 7, 8, 10 and 11, respectively.

The system also includes four additional registers indicated by the boxes labeled A to D (FIGS. 13D and 13E), which are three- or four-position unidirectional electronic ring counters, such as disclosed in the aforementioned Mahoney and Murthy Patent No. 3,235,748. Their operation with the associated flip-flop devices and gating arrangements under control of the special functional keys to provide the item entry, computing and print cycles of the Program (Table I) will now be described.

The function of the A-Register or unidirectional ring counter is to enter item prices into the Input Register IR, either through the Item keys or the Amount keyboard AK. Assume that the A-Register is on position one, the rest position. The output AND gate AG101 is then one-half enabled and the output AND gates AG102 and AG103 are disabled. If a "start" pulse now occurs via the 50 millisecond delay generator MV1 being triggered by an Item key or Manual Entry key through OR gate OG2, AND gate AG101 will have both halves enabled and a pulse passes into line A. Line A is connected to a Shift Register Driver $SRD_1$, which acts to shift the A-Register to position two. At position two of the A-Register the following occurs: (1) one-half of AG102 is enabled; (2) the oscillator is gated for 5 kc. provided by one pulse output of the selective oscillator SO; and (3) an "ADD Input to Total" signal occurs causing the information in the Input Register IR to be transferred to the Total Register in the manner described in connection with FIG. 3. At the completion of this action, an "Input to Total Complete" signal occurs which enables the other half of AG102 to pass a signal to the A-line for shifting the A-Register via $SRD_1$ to position three. At position three, the following occurs: (1) one-half of AG103 is enabled; (2) a "Print Command Signal" is given; (3) a "Set Input Counter" signal occurs; and (4) an "Enable Total Carry Gate" signal occurs. The "Enable Total Carry Gate" $G_{TC}$ signal passes any stored carry pulse from the Total Cents Register to the Total Dollars Register. The "Set Input Counter" signal acts to set the new item price or keyboard price into the Input Register in the manner previously described in connection with FIG. 4. The "Print" signal causes the printer to print the information in the Input Register (this means that the new information in the Input Register is printed each time). At the end of the print cycle, a "Print Complete" signal occurs which passes a signal through AG103 onto the A-line shifting the A-Register via $SRD_1$. The A-Register is now shifted back to position one, as it is connected in a ring such that after the last position it returns to the first position. At position one of the A-Register AG101 is one-half enabled. If only one item had been ordered, the A-Register cycle would end here. If the other multiplier keys had been used, the A-cycle would repeat once for each item ordered.

It has been shown that the A-Register adds the previous item price to the running total in the Total Register and inserts the new item price in the Input Register. At this point in the machine cycle, the B-Register would be used to obtain a sub-total or a sub-total plus automatic tax if this option is provided.

The operation of the B-Register will now be described. In the rest condition, the B-Register is on its zero stage so that AND gate AG104 is one-half enabled and AND gate AG105 through AND gate AG114 is disabled.

*Obtaining a Sub-Total*

To obtain a Sub-Total, the Sub-Total key would be depressed and pass a signal through OR gate OG101 and enable the second half of AND gate AG104. A signal is now passed onto line B, which acts to shift the B-Register to position one via the shift register driver $SRD_2$. At position one, the following occurs: (1) AG105 is enabled (the normal condition of FF12 enables the other half of AG105) and the oscillator SO is gated for 5 kc.; (2) AG106 is one-half enabled; and (3) an "ADD Input to Total" signal occurs. The "Add Input to Total" signal acts to transfer the last item entry price from the Input Register to the Total Register in the manner previously described with FIG. 3. At the completion of this an "Input to Total Complete" signal occurs and enables the second half of AG106 which applies a pulse to the B-line shifting the B-Register to position two.

At position two, the following occurs: (1) AG107 is one-half enabled; (2) the oscillator SO is gated for 5 kc.; and (3) a "Total to Input" signal occurs. The "Total to Input" signal shifts the information in the Total Register (which is the Sub-Total) to the Input Register, at the completion of which a "Total to Input Complete" signal occurs and enables the second half of AG107, which applies a signal to the B-line shifting the B-Register to position three. At position three, the following occurs: (1) AND gate AG108 is one-half enabled; (2) a "Print" command signal is given; (3) an "Enable Mechanical Carry Gates" signal occurs; and (4) a signal is sent to the tax calculating circuit TCA to reset a flip-flop and the bidirectional and unidirectional ring counter (see explanation of tax calculation in connection with FIG. 11). The "Enable Mechanical Carry Gates" signal will be described in connection with the operation of adding a Manual Tax to the Sub-Total. The "Print" command signal causes the printer to print the Sub-Total which is in the Input Register. At the completion of the printer cycle A, a "Print Complete" signal occurs which enables the second half of AND gate AG108 and passes a pulse onto line B which acts to shift the B-Register ring counter to position four. At position four, the following occurs: (1) AND gates AG109 through AG114 are one-half enabled; and (2) a "Reset Mechanical Carry FF" signal occurs. The operation of the "Reset Mechanical Carry FF" will be described with the Manual Tax. The B-Register ring counter at position four is at a "wait" position in that it is waiting for an instruction from one of the function keys (Total, Special, etc.).

A description of the operations performed by activating the function keys follows:

(a) Total key (calculation of Sub-Total plus Tax); Depressing the Total key acts to: (1) open the cash drawer; and (2) set $FF_A$.

The output of $FF_A$ (the Auto Tax FF) enables the second half of AG109 (the Automatic Tax Cycle Gate), and a pulse is passed onto line D which acts through the Shift Register driver $SRD_4$ to shift the D-Register ring counter to position number one. The D-Register would now go through the Automatic Tax Cycle which in the manner described in connection with FIG. 11 calculates the tax on the sub-total previously obtained. The final result would be the sub-total plus automatic tax displayed in the Input Register;

(NOTE: It should be noted here that the operation of the Special key through $FF_C$ or Manual Tax key through $FF_B$ could follow the operation of either the Sub-Total key or the Total key so that the explanation which follows applies for either condition.);

(b) *Special key.*—(The Special key is used to add to the sub-total a special item which would not be taxed or taxed at a special rate.)

Depressing the Special key acts to set $FF_C$, the Special flip-flop. One output of $FF_C$ enables AG111 while the other disables AG109, the Automatic Tax Cycle Gate. The output of AG111 applies a pulse to the B-line stepping the B-Register ring counter through $SRD_2$ to its zero position. The Special item is now entered via the Item key or Amount keyboard via the A-Register cycle. The Sub-Total or the Total key can now be activated to obtain a total of the sub-total plus tax on the sub-total plus the special item.

(c) *Manual Tax key.*—(The Manual Tax key is used to add a manual tax to the sub-total.)

Depressing the Manual Tax key sets $FF_B$ (the Manual Tax flip-flop). One output of $FF_B$ enables AG110, gives "Enable Mech. Cents Tax Counter" and "Enable Mech. Dollars Tax Counter" signals to enable these counters in the mechanical accumulator MA. The other output of $FF_B$ acts to disable AG109, the Automatic Tax Cycle Gate, and AG105. This is necessary so that no automatic tax is calculated when a new sub-total plus manual tax is obtained. The output of AG110 applies a pulse to the B-line which steps the B-Register ring counter through $SDR_2$ to its zero stage. Manual tax is now entered through the amount keyboard utilizing the A-Register cycle. To obtain the new total, the Total key is depressed and the B-Register is utilized. At position two of the B-Register, the manual tax is added to the sub-total in the Total Register. This is normally done at 5 kc., but since AG105 is disabled it operates at a 40 cycle rate. This is necessary because the manual tax is added to the mechanical tax counters in the mechanical accumulator MA during this information transfer. The mechanical tax counters had been enabled via the output of $FF_B$, the Manual Tax flip-flop. The reason for the "Enable Mech. Carry Gate" signal at position three and "Reset Mech. Carry FF" signal at position four of the B-Register is now apparent (see the description of the Mechanical Accumulator MA in connection with FIG. 7).

*Change key.*—(The Change key is used to calculate change.) The tendered amount is entered through the amount keyboard AK and the Change key depressed. The subsequent action is described in the following sections on the operation of the C-Register.

If the cash drawer is closed after the operation of using the Total key and accepting the proper cash from a customer, a "Drawer Closed" signal passes through AG114 which initiates the C-cycle.

A description of the operation of the C-Register follows. In the inactive state or rest position, the unidirectional ring counter of Register-C is at position one. There are two operations which can initiate the C-cycle: (1) depressing the Total Transfer key; and (2) depressing the Change key.

*The operation of the C-Cycle using the Total Transfer Key*

The Total Transfer key would be depressed after the sale is complete and the correct amount placed in the cash drawer. This would set $FF_D$, the outputs of which act to disable AND gate AG116 and enable AG113 and AG118. Since AG113 has been previously one-half enabled at position four of the B-Register ring counter, a signal passes onto line C stepping the ring counter of the C-Register to position two. At position two, the following occurs: (1) $FF_B$ (Manual Tax) and/or $FF_C$ (Special) is reset; (2) a "Subtract Input and Total" signal occurs; (3) the Mechanical Total Cents and Total Dollars accumulators in MA are enabled; (4) one pair of the A–D Total Dollars and Total Cents is enabled (this depends on which key A–D is depressed); and (5) AG115 is one-half enabled. The "Subtract Input and Total" signal acts to count down the Input and Total Registers simultaneously. When the Total Register is counted down to zero (both dollars and cents), a "Total to Input Complete" signal occurs. During this count down cycle, which is done at a low frequency (20 c.p.s.), the mechanical Total Dollars, Total Cents, and one pair of the A–D Total Dollars and Total Cents are counted up by the same amount the Total Register is counted down. Thus, a running total of the day's sales is kept. The "Total to Input" signal passes through AG115 and steps the ring counter of the C-Register to position three via SRD$_3$. At position three of the C-Register, the following occurs: (1) AND gates AG116, AG117, AG118, and AG119 are one-half enabled; (2) the "Mechanical Carry" gate $G_{MC}$, "A–D Mechanical Carry" gate $G_{MC}$, and "Input Carry" gate $G_{IC}$ are enabled; and (3) the Total Dollars A mechanical counter in MA and A–D Dollars mechanical counters are enabled. The carry gates which were enabled pass any stored carry pulse into the dollar counters. A signal now passes through AG118 which through OR gate OG2 initiates System Clear signals from Clear generator CG ending the machine cycle.

*The operation of the C-Register using the Change Key*

The Change key is depressed after the tendered amount is entered through the amount keyboard. The Change key resets FF$_A$ (Automatic Tax) and applies a signal to the C-line via AG112. The ring counter of the C-Register is stepped to position two and the Input and Total Registers are counted down as previously described. At the completion of the action at position two of the C-Register counter, that register is stepped to position three. At position three, the same action as described previously occurs with the exception of the signal passing through AG118. AG118 is disabled since FF$_D$ has not been set. If the "Drawer Open" signal is present, a signal passes through AG116 causing a "Print Command" which prints the change which is in the Input Register. The "Print Complete" signal passes through AG119 which steps the ring counter of the C-Register to position four. At position four, AG120 is one-half enabled and closing the cash drawer causes a "Drawer Closed" signal which initiates System Clear.

*Operation of the C-Register using the "Drawer Closed" Signal*

If the C-cycle is started by closing the cash drawer and passing a signal through AG114, the ring counter of the C-Register would go through position two and carry out the previously described operation. It would then go to position three where AG117 would activate "System Clear" signal from the Clear generator CG which would return all apparatus to the initial operating condition. It should be noted that in all cases the C-Register cycle is carried out before the machine can be used to enter the order from another customer and, therefore, the overall cash totals are always recorded in the mechanical accumulator MA.

No amplifiers are shown in the circuit of the logic diagram of FIG. 13A to E, but it is understood that one would be used to provide proper amplification of the controlling pulses wherever necessary. Suitable labeled lines between the different sectional units of the system of FIGS. 13A to E describe the operations produced by the coupling between the sections as described above.

Various modifications of the various features of the system which had been illustrated and described which are within the spirit and scope of the invention will appear to persons skilled in the art.

What is claimed is:

1. In combination with a first ring counter of bidirectional type, having cents, 10-cent, dollars and 10-dollar decade portions, for counting and storing therein pulses in number representing information on the total running price before tax, or sub-total price, of the quantity of commodity items, or services, sold on a single order to a customer; a circuit for computing and indicating the tax on said sub-total price comprising indicating means including mechanical tax counter means having cents and dollars portions; a plurality of gates each representing a different tax break in accordance with said law, connected to different outputs of said counter portions and adapted to be enabled thereby when said first counter counts a sum equal to that tax break; control means controlled from the output of said dollars and 10-dollar counter portions for selecting the range of tax breaks and the repetitive cycles thereof under said law applicable to said subtotal price; means responsive to signals generated by said circuit in different operating cycles for causing the tax on the cents and dollars part of said subtotal to be calculated separately in the form of an appropriate number of pulses of one cent value each transmitted through enabled ones of said gates selected by said control means; and means for transmitting the pulse outputs of all the enabled gates to said indicating means to accumulate the tax information therein.

2. The combination of claim 1, in which said control means includes one flip-flop means adapted to be set into one stable state when the controlling count of said first counter means represents a sum at least equal to a predetermined value at which the tax set by said law changes from an irregular to a regular progression, and reverts to another state when the controlling count represents a sum below that value at which the tax breaks are irregular; another flip-flop means which indicates by its setting whether the controlling count in the dollars count is 0 or $1, respectively, depending on whether the dollar amount is odd or even; and a second multi-step bidirectional counter connected either as a binary or ternary counter for controlling the repetitive cycle of said tax breaks.

3. The combination of claim 2, in which said gates are multi-input AND gates the input terminals of which are respectively connected to bus wires in a wiring matrix which are, in turn, connected to appropriate output connections of the counter portions of said first counter means, the gates connected to said cents and 10-cent portions being divided into four groups which are controlled by four enabling lines, themselves controlled by the outputs of said flip-flop means and said second ring counter, in which only one enabling line is active at a time, when the dollar amount counted in the dollars and 10-dollar counters are respectively 0; $1; $2, 4, 6, 8, etc.; and 3, 5, 7, 9, etc., to provide the non-repeating and repeating tax breaks under said law, the value of the tax break depending on the particular value of the connections to the cents and 10-cent counter portions.

4. The combination of claim 2, in which the tax on the cents portion of the subtotal is accomplished while counting down said cents and 10-cent counter portions to zero and as the value in these counters passes through each tax break, a tax gate selected by said flip-flop means and said second counter is enabled sending the proper number of pulses corresponding to the tax break equivalent to one cent each through the enabled gate to the cents mechanical counter accumulating the tax.

5. The combination of claim 2, in which said gates include four gates respectively controlled from the output of the dollars and 10-dollar portions of said first counter, and said control means includes a third multi-step ring counter of the unidirectional type adapted to count up to as many steps as the highest tax cents per dollar in use at the time; and the calculation of the tax on the dollars part of the subtotal is accomplished by counting down said dollars and 10-dollars counter portions step by step issuing the appropriate number of tax pulses for each dollar as determined by the tax breaks in that dollar under control of said third counter interconnected with said flip-flop means and a respective one of said four gates representing different tax breaks selected by said control means for each dollar of the tax.

6. The combination of claim 2, in which the two inputs to said one flip-flop means are respectively connected through separate AND gates to the outputs of the dollars and 10-dollar portions of said first counter and the two inputs of said other flip-flop means are connected to the output of said first counter in such manner that it counts in binary with the dollars and 10-dollar counter portions and indicates whether the amount therein is 0 or $1 both in forward and reverse, and the outputs of both said one and said other flip-flop means are connected to both groups of gates controlled from the outputs of the cents and 10-cent portions, and of the dollars and 10-dollar portions, so as to control the particular gates in these groups applicable to the cents and dollars of said subtotal.

7. The combination of claim 1, in which the tax pulses produced during the calculation on the dollars part of said subtotal is also added into the said cents cumulative counter and simultaneously into the cents counter portion of said first counter which has been previously cleared of price information during the cents tax calculation, for storage therein.

8. The combination of claim 7, in which said computing and indicating circuit includes in combination with said first bidirectional counter means constituting a total register a fourth bidirectional ring counter having cents, 10-cents, dollars and 10-dollar decade portions, forming an input register for counting and storing pulses representing individual item prices, and when the tax cents pulses from the dollars calculation exceed 100, a dollar carry is issued to both the mechanical cumulative tax dollar counter and the input register counter dollars portion for storage therein, the number in the input register being then the subtotal plus tax.

9. The combination of claim 8, in which finally the pulse contents of the cents portion of said first counter is transferred into the mechanical cumulative counter at a speed of 40 cycles per second to insure its operation at the proper rate to accurately store these pulses.

10. The combination of claim 8, in which the tax on the cents part of said subtotal is started in response to a first signal produced in a first cycle of operation of said circuit when the transfer of the contents of said input register to said total register for one order is completed, and the tax on the dollar part of said subtotal is started later in response to a second signal produced by said circuit in a second cycle of operation when the counting down of said cents and 10-cent portions of the total register in the calculation of the tax on the cents part of the subtotal has reached zero, and the tax on the dollars of said subtotal employs a third multi-step ring counter which has the function of counting out the number of tax pulses (equivalent to one cent each) in each dollar amount of the subtotal contained in the dollars and 10-dollar portions of the first counter forming the total register.

11. The combination of claim 10, in which the means for transmitting the pulse outputs of all the enabled gates to said indicating means includes a second OR gating means for connecting the outputs of the group of AND gates used in the calculation of the tax on the dollars part of the subtotal to a tax line leading to a mechanical tax counter, and a one-shot multivibrator oscillator having a delay in its operation of the order of 200 microseconds, which oscillator is fired in response to a start pulse to produce timing pulses which pass through said OR gate to the tax line leading to the mechanical tax counter of said indicating means, these pulses being also counted up in the cents and 10-cent counters of said first counter forming the total register, now cleared of their previous contents by the counting down of these counters during the cents tax calculation, and simultaneously counted in said third step ring counter.

12. The combination of claim 11, in which when said third step counter reaches its last step position, said second OR gating means is enabled and a timing pulse passes therethrough to the tax line which pulse also resets said oscillator to its zero position, counts the dollars and 10-dollar counter in the total register and shifts said second step counter to the "0" state; and this process is repeated for the tax breaks in each dollar of said subtotal.

No references cited.

MALCOLM A. MORRISON, *Primary Examiner.*

I. FAIBISCH, *Assistant Examiner.*